US012697196B1

(12) United States Patent

Best

(10) Patent No.: US 12,697,196 B1

(45) Date of Patent: Aug. 4, 2026

(54) PRESSURE-SAFE ELECTRIC TOOTHBRUSH

(71) Applicant: Powerclaim GmbH, Munich (DE)

(72) Inventor: Bastian Best, Munich (DE)

(73) Assignee: Powerclaim GmbH, Munich (DE)

( * ) Notice: Subject to any disclaimer, the term of this patent is extended or adjusted under 35 U.S.C. 154(b) by 0 days.

(21) Appl. No.: 19/305,561

(22) Filed: Aug. 20, 2025

(51) Int. Cl.
*A61C 17/22* (2006.01)

(52) U.S. Cl.
CPC .......... *A61C 17/221* (2013.01); *A61C 17/222* (2013.01)

(58) Field of Classification Search
CPC ..... A61C 17/22; A61C 17/221; A61C 17/222; A61C 17/3409; A61C 17/31418; A61C 17/3427; A61C 17/3436; A61C 17/3445; A61C 17/3454; A61C 17/3463; A61C 17/3472; A46B 15/0002; A46B 15/0004; A46B 15/0012; A46B 15/0014
See application file for complete search history.

(56) References Cited

U.S. PATENT DOCUMENTS

| | | | | |
|---|---|---|---|---|
| 7,743,452 B1 * | 6/2010 | Tcholakov | ......... | A46B 15/0002 15/201 |
| 2005/0108841 A1 * | 5/2005 | Edwards | ................ | A61C 17/34 15/167.1 |
| 2017/0319311 A1 * | 11/2017 | Luettgen | ............ | A46B 15/0012 |

FOREIGN PATENT DOCUMENTS

| | | | | | |
|---|---|---|---|---|---|
| DE | 202005003511 U1 * | 6/2005 | ......... | A61C 17/3472 |
| KR | 102801669 B1 * | 4/2025 | ......... | A46B 15/0012 |

* cited by examiner

*Primary Examiner* — C. A. Rivera

(74) *Attorney, Agent, or Firm* — Blueshift IP; Robert Plotkin

(57) ABSTRACT

An electric toothbrush head includes a bristle field with responsive bristles that decrease in stiffness in response to excessive brushing pressure. The toothbrush head also features a mechanical force-protection mechanism, which induces a reversible displacement of the bristle field in response to excessive brushing force. These features help to mitigate the effects of excessive force and provide a safer brushing experience.

16 Claims, 2 Drawing Sheets

FORM A PLURALITY OF BRISTLES FROM A STIMULUS-RESPONSIVE MATERIAL, THE MATERIAL BEING SELECTED TO PROVIDE A REVERSIBLE DECREASE IN STIFFNESS IN RESPONSE TO A FIRST CONDITION INDICATIVE OF EXCESSIVE BRUSHING PRESSURE 302

MOUNT THE PLURALITY OF BRISTLES TO FORM A BRISTLE FIELD ON A HEAD CHASSIS 304

INTEGRATE THE HEAD CHASSIS WITH A MECHANICAL FORCE-PROTECTION MECHANISM CONFIGURED TO INDUCE A REVERSIBLE PHYSICAL DISPLACEMENT OF THE BRISTLE FIELD IN RESPONSE TO A SECOND CONDITION INDICATIVE OF EXCESSIVE BRUSHING FORCE, WHEREIN SAID DISPLACEMENT COMPRISES AT LEAST ONE OF A ROTATIONAL SLIP, A LINEAR RETRACTION, OR AN ANGULAR TILT 306

200

DETECT A FIRST CONDITION INDICATIVE OF EXCESSIVE BRUSHING PRESSURE AT A BRISTLE FIELD 202

IN RESPONSE TO THE FIRST CONDITION, AUTOMATICALLY CAUSE A REVERSIBLE DECREASE IN THE STIFFNESS OF A PLURALITY OF BRISTLES WITHIN THE BRISTLE FIELD, WHEREIN THE BRISTLES COMPRISE A STIMULUS-RESPONSIVE MATERIAL 204

DETECT A SECOND CONDITION INDICATIVE OF EXCESSIVE BRUSHING FORCE APPLIED TO THE BRISTLE FIELD 206

IN RESPONSE TO THE SECOND CONDITION, AUTOMATICALLY INDUCE A REVERSIBLE PHYSICAL DISPLACEMENT OF THE BRISTLE FIELD, WHEREIN THE DISPLACEMENT COMPRISES AT LEAST ONE OF A ROTATIONAL SLIP, A LINEAR RETRACTION, OR AN ANGULAR TILT 208

FIG. 2

300

FORM A PLURALITY OF BRISTLES FROM A STIMULUS-RESPONSIVE MATERIAL, THE MATERIAL BEING SELECTED TO PROVIDE A REVERSIBLE DECREASE IN STIFFNESS IN RESPONSE TO A FIRST CONDITION INDICATIVE OF EXCESSIVE BRUSHING PRESSURE 302

MOUNT THE PLURALITY OF BRISTLES TO FORM A BRISTLE FIELD ON A HEAD CHASSIS 304

INTEGRATE THE HEAD CHASSIS WITH A MECHANICAL FORCE-PROTECTION MECHANISM CONFIGURED TO INDUCE A REVERSIBLE PHYSICAL DISPLACEMENT OF THE BRISTLE FIELD IN RESPONSE TO A SECOND CONDITION INDICATIVE OF EXCESSIVE BRUSHING FORCE, WHEREIN SAID DISPLACEMENT COMPRISES AT LEAST ONE OF A ROTATIONAL SLIP, A LINEAR RETRACTION, OR AN ANGULAR TILT 306

FIG. 3

PRESSURE-SAFE ELECTRIC TOOTHBRUSH

TECHNICAL FIELD

This disclosure relates to the field of oral care appliances, and more specifically to toothbrush heads with safety functions to prevent over-brushing while preserving plaque removal efficacy.

BACKGROUND

Oral hygiene plays a critical role in maintaining overall health, with tooth brushing serving as a fundamental practice for removing plaque and preventing dental diseases. Electric toothbrushes have gained widespread popularity since their introduction in the mid-20th century, offering advantages over manual brushing through powered bristle movement that can enhance plaque removal and simplify the brushing process for many users.

Dental professionals generally recommend brushing teeth at least twice daily for approximately two minutes each session. However, the effectiveness of tooth brushing depends not only on frequency and duration but also on proper technique. One significant concern in oral care is the application of excessive force during brushing, commonly referred to as "over-brushing."

Over-brushing can lead to various dental health issues. When users apply too much pressure while brushing, they may damage gum tissue, potentially leading to gum recession where the margin of gum tissue surrounding the teeth wears away or pulls back, exposing more of the tooth or tooth root. This exposure can cause tooth sensitivity and create opportunities for decay. Additionally, aggressive brushing with excessive force can contribute to enamel abrasion, gradually wearing away the protective outer layer of teeth, which does not regenerate once damaged.

Research has shown that many individuals apply more force than necessary when brushing their teeth. This tendency occurs with both manual and electric toothbrushes, though the powered movement of electric brushes can sometimes exacerbate the issue if users apply the same force they might use with manual brushing. Notably, most people are unaware that they are applying excessive pressure during their brushing routine, making this a challenging issue to address through education alone.

The geometry and angle at which users hold the brush can also impact the distribution of pressure across teeth and gums. Improper angles may concentrate force on particular areas, potentially causing localized damage over time. Users often struggle to maintain consistent, appropriate angles throughout the brushing process, particularly when reaching back molars or other less accessible areas of the mouth.

A significant challenge in toothbrush design involves balancing effective plaque removal with prevention of excessive force. Simply reducing the mechanical action or stiffness of bristles might protect gum tissue but could compromise cleaning efficacy. Conversely, designs that prioritize plaque removal might inadvertently enable damaging brushing practices.

Various approaches have been explored to address the problem of over-brushing. Some electric toothbrushes incorporate pressure sensors that provide warnings when excessive force is detected. Other designs have experimented with bristle configurations or handle ergonomics in attempts to influence user behavior. Manual toothbrushes sometimes feature flexible necks or specially designed bristles to mitigate some effects of excessive force. However, these approaches have limitations in their effectiveness, particularly for users who have developed habitual over-brushing techniques over many years.

The timing and nature of feedback provided to users present another design challenge. Visual, audible, or tactile signals might help users recognize when they are applying excessive pressure, but the implementation of such feedback mechanisms needs to be intuitive and noticeable without being intrusive to the brushing experience. Furthermore, feedback that occurs after pressure has already been applied may have limited preventative benefit.

The challenge of preventing gum damage and enamel wear from over-brushing persists despite advances in toothbrush design. Users often do not receive immediate feedback about improper brushing technique until damage has already occurred, which may take months or years to become apparent. Additionally, different users have varying brushing habits, force application, and oral sensitivity levels, making a one-size-fits-all solution difficult to achieve.

Challenges remain in developing toothbrush technologies that can effectively prevent over-brushing while maintaining cleaning efficacy, providing appropriate user feedback, and accommodating the diverse needs and habits of individual users.

SUMMARY OF THE DISCLOSURE

It is an object of embodiments of the present disclosure to prevent oral tissue damage during toothbrushing. Another object is to provide an electric toothbrush head and system capable of automatically regulating brushing force through adaptive materials and mechanical mechanisms, thereby enhancing user safety and maintaining effective cleaning performance. These objectives are achieved by the subject-matter defined in the independent claims. Advantageous modifications of embodiments of the present disclosure are defined in the dependent claims as well as in the description and the drawings.

In a first aspect, the present disclosure relates to an electric toothbrush head. The electric toothbrush head is designed for attachment to a drive unit, such as those commonly found in powered oral hygiene devices.

In embodiments, the toothbrush head comprises a bristle field having a plurality of bristles, wherein the bristles comprise a stimulus-responsive material. Accordingly, the bristle field includes multiple bristles, each of which is formed, at least in part, from a stimulus-responsive material. The stimulus-responsive material may be configured to provide a reversible decrease in stiffness in response to a first condition indicative of excessive brushing pressure. Accordingly, the stimulus-responsive material is selected and engineered to undergo a reversible reduction in stiffness when exposed to a first condition that signals excessive brushing pressure. Such a first condition may include, for example, a threshold level of mechanical stress, temperature change, or other physical parameter associated with the application of excessive force during brushing. The reversible decrease in bristle stiffness serves to mitigate the risk of gum or enamel damage by reducing the effective hardness of the bristles when excessive pressure is detected, thereby providing a protective response that is automatically reversed when normal brushing conditions resume.

A common solution to overly hard brushing in electric toothbrushes is not to alter bristle stiffness, but to signal or cut off the power via pressure sensors. In manual brushes, manufacturers simply recommend softer bristle grades for sensitive gums. The stimulus-responsive bristles according to the above embodiment is therefore a significant departure: it proposes bristles made from advanced material (shape-memory polymer or piezoelectric composite) that intrinsically bend or relax beyond a certain force threshold. This self-regulating behavior has no direct precedent in toothbrush design. The closest analogs are either passive soft bristle designs or electronic feedback systems-neither of which achieve the direct material-level adaptation proposed. Thus, the use of "smart" bristle filaments to automatically cushion the gums is an unprecedented approach in oral care. The difference lies in replacing external feedback or static softness with an active, material-based response to user behavior, which is a non-obvious leap.

Furthermore, the stimulus-responsive bristles combine dynamics (making elements adjustable) with a clever parameter change in material properties to achieve an unconventional pairing. Instead of simply warning the user, the brush itself adapts in real time, a non-obvious approach influenced by smart materials technology. This cross-domain leap goes beyond incremental pressure sensors, offering a self-regulating mechanism.

In embodiments, the toothbrush head comprises a mechanical force-protection mechanism. The force-protection mechanism may be configured to induce a reversible physical displacement of the bristle field in response to a second condition indicative of excessive brushing force. The displacement may be relative to a drive unit. The second condition indicative of excessive brushing force may be distinct from the first condition or may overlap in certain operational scenarios. Said displacement may comprise at least one of a rotational slip, a linear retraction, or an angular tilt. These displacement modes are intended to absorb or redirect excessive force, thereby reducing the risk of injury to oral tissues and prolonging the service life of the toothbrush head.

The combination of stimulus-responsive bristles and a mechanical force-protection mechanism provides a dual-layered approach to user safety and oral care efficacy. The stimulus-responsive material enables the bristles to adapt dynamically to brushing conditions, while the mechanical mechanism offers an additional safeguard by physically altering the position of the bristle field under excessive load.

In embodiments, the toothbrush head may be manufactured using conventional injection moulding or overmoulding techniques, with the stimulus-responsive material integrated into the bristle matrix or as a coating. The mechanical force-protection mechanism may employ springs, friction clutches, elastomeric couplings, or other suitable components to achieve the desired displacement behaviour.

In embodiments, the electric toothbrush head is compatible with standard drive units and may be attached via a conventional coupling interface. The design ensures that, under normal brushing conditions, the bristle field remains rigidly coupled to the drive unit, transmitting motion efficiently for effective cleaning. Only when excessive pressure or force is detected do the protective features activate, after which the system returns to its original configuration once safe operating conditions are restored. This reversible functionality ensures both user safety and consistent cleaning performance throughout the service life of the toothbrush head.

In embodiments, the first condition may be an increase in temperature of the bristles to an oral temperature. This allows the bristles to automatically adapt to the oral environment without requiring user intervention.

In embodiments, the first condition may be an application of mechanical force to the bristles exceeding a first pressure threshold. This provides immediate response to excessive force, protecting gums from damage due to aggressive brushing.

In embodiments, the stimulus-responsive material may be a shape-memory polymer. Shape-memory polymers provide reliable and repeatable changes in stiffness in response to temperature or force, ensuring consistent protection.

In embodiments, the stimulus-responsive material may be a piezoelectric composite. Piezoelectric composites can actively respond to applied forces, providing dynamic protection against excessive pressure.

In embodiments, the stimulus-responsive material may be a magneto-rheological elastomer, and wherein the head further comprises a magnetic field generator configured to alter a magnetic field applied to the bristles to cause the reversible decrease in stiffness. This allows for precise electronic control of bristle stiffness based on real-time pressure conditions.

In embodiments, the reversible decrease in stiffness may be a reduction in effective tip stiffness of at least 40 percent when measured between 22° C. and 37° C. This significant reduction ensures effective protection while maintaining cleaning efficiency.

In embodiments, the mechanical force-protection mechanism may activate when the second condition corresponds to an applied tip force exceeding 150 grams. This specific threshold provides protection at clinically relevant force levels known to potentially cause gum damage.

In embodiments, the physical displacement may be the rotational slip, and the mechanical force-protection mechanism comprises a clutch mechanism. A rotational slip mechanism provides intuitive tactile feedback to the user while preventing excessive force transmission.

In embodiments, the clutch mechanism may be a magnetic torque micro-clutch calibrated to slip at an equivalent tip force between 160 grams and 200 grams. This precise calibration ensures consistent protection while allowing effective cleaning at safe pressure levels.

In embodiments, the physical displacement may be the linear retraction, and the mechanical force-protection mechanism comprises a spring-mounted subassembly. Linear retraction provides a shock-absorbing effect that effectively buffers excessive force while providing clear visual feedback to users.

In embodiments, the linear retraction may be over a distance between 1.0 mm and 2.0 mm. This specific range of retraction ensures noticeable feedback to the user while maintaining brush stability.

In embodiments, the spring-mounted subassembly may further comprise a viscoelastic dashpot cartridge configured to provide rate-dependent damping. Rate-dependent damping differentiates between slow and fast force application, providing enhanced protection against sudden pressure spikes.

In embodiments, the physical displacement may be the angular tilt, and the mechanical force-protection mechanism is located in a neck portion of the toothbrush head. Angular tilt automatically adjusts the brush orientation to the optimal tooth-cleaning angle, reducing gum irritation.

In embodiments, the angular tilt may be between 10 degrees and 15 degrees relative to a longitudinal axis of the neck portion. This specific angle range provides optimal adaptation to tooth surfaces while preventing gum damage.

In embodiments, the mechanical force-protection mechanism may comprise an eccentric cam and a compliant joint.

This mechanism ensures smooth, controlled tilting action that automatically returns to neutral when pressure is reduced.

In embodiments, the eccentric cam mechanism may comprise at least one detent configured to provide tactile feedback upon engagement. Tactile feedback helps users learn proper brushing pressure through immediate physical cues.

In embodiments, the electric toothbrush head may further comprise a feedback generator configured to provide a user-perceptible signal upon the inducement of the physical displacement. Additional feedback reinforces proper brushing technique through multiple sensory channels.

In embodiments, the user-perceptible signal may be at least one of a visual signal from an LED, a tactile signal comprising a click or patterned vibration, or an audible signal.

Multi-modal feedback ensures users with different sensory preferences receive effective coaching.

In embodiments, the plurality of bristles may further comprise hydrogel cap tips configured to swell under compressive load. Swelling hydrogel caps reduce abrasion on teeth and gums during high-pressure brushing events.

In embodiments, the plurality of bristles may be mounted on telescopic spiral root anchors configured to reversibly extend under compressive load. This feature increases contact area under pressure, effectively distributing force to prevent localized damage.

In embodiments, the electric toothbrush head may further comprise a transparent window configured to permit viewing of at least a portion of the mechanical force-protection mechanism. Visual confirmation of the mechanism's operation enhances user understanding and trust in the protective features.

In a second aspect, the present disclosure relates to an electric toothbrush. The electric toothbrush may comprise a handle. The handle may comprise a drive unit. The electric toothbrush may comprise the electric toothbrush head of the first aspect, which may be operably coupled to the drive unit. The handle may optionally house a power source, such as a rechargeable battery or replaceable batteries, and may contain electronic circuitry for controlling the operation of the drive unit. The drive unit itself may be realized as an electric motor, a piezoelectric actuator, or any other suitable mechanism capable of imparting motion to the toothbrush head.

The electric toothbrush head, which may be detachably or permanently coupled to the handle, can be configured in accordance with any of the embodiments described above. For example, the head may optionally include a bristle field having a plurality of bristles, where the bristles may comprise a stimulus-responsive material adapted to provide a reversible decrease in stiffness in response to a first condition, such as excessive brushing pressure. Additionally, the head may optionally incorporate a mechanical force-protection mechanism, which could be arranged to induce a reversible physical displacement of the bristle field relative to the drive unit in response to a second condition, for instance, excessive brushing force. The physical displacement may include, but is not limited to, rotational slip, linear retraction, or angular tilt.

In some possible configurations, the coupling between the toothbrush head and the drive unit may be achieved via a mechanical interface, such as a snap-fit, bayonet, or threaded connection, allowing for easy replacement or interchangeability of the head. Alternatively, the head may be permanently affixed to the handle, forming an integrated assembly. The drive unit may be arranged to deliver oscillatory, rotational, or reciprocating motion to the bristle field, depending on the specific design and intended cleaning action.

It is also conceivable that the handle may include user interface elements, such as buttons, switches, or touch-sensitive controls, for selecting operational modes, adjusting intensity, or activating additional features. In some embodiments, the handle may further comprise indicators, such as LEDs or display screens, to provide feedback regarding battery status, brushing duration, or activation of protective mechanisms. Wireless charging capabilities or waterproof construction may also be incorporated, depending on the intended application and user requirements.

The electric toothbrush may be designed for compatibility with a range of toothbrush heads, including those with adaptive or protective features as described herein. In certain variants, the system may be configured to detect the presence or type of head attached and adjust operational parameters accordingly. The combination of a handle with a drive unit and a toothbrush head featuring stimulus-responsive bristles and/or a mechanical force-protection mechanism may provide enhanced safety, comfort, and cleaning efficacy for the user.

Overall, the electric toothbrush may be realized in numerous forms, with the specific arrangement and features of the handle, drive unit, and toothbrush head being selected according to performance objectives, manufacturing considerations, and user preferences. The embodiments described herein are intended to illustrate possible configurations and should not be construed as limiting the scope of the disclosure.

In embodiments, the drive unit may be configured to momentarily reduce its operational intensity in response to the physical displacement of the toothbrush head. This coordinated response between mechanical protection and motor function provides enhanced safety while maintaining cleaning efficacy.

In embodiments, the handle may comprise a power source operably coupled to a feedback generator located on the toothbrush head. This integration enables power-efficient feedback that reinforces proper brushing technique.

In a third aspect, the present disclosure relates to a method of automatically regulating brushing force applied by an electric toothbrush.

In embodiments, the method comprises detecting a first condition indicative of excessive brushing pressure at a bristle field. This first condition may be identified by a sensor, a change in a physical property of the bristles, or by the inherent response of the stimulus-responsive material itself. For example, the first condition may correspond to a threshold level of pressure, temperature, or mechanical stress experienced by the bristles during brushing.

In embodiments, the method comprises, in response to the first condition, automatically causing a reversible decrease in the stiffness of a plurality of bristles within the bristle field. The bristles may comprise a stimulus-responsive material. The stimulus-responsive material is selected so that, when exposed to the first condition, it undergoes a physical or chemical change that results in a reduction of its modulus or rigidity. This reversible decrease in stiffness allows the bristles to flex more readily under load, thereby reducing the risk of excessive force being transmitted to the teeth and gums. The decrease in stiffness is automatically reversed when the first condition is no longer present, restoring the bristles to their original state for continued effective cleaning.

In embodiments, the method comprises detecting a second condition indicative of excessive brushing force applied to the bristle field. The second condition may be determined by monitoring the force exerted on the bristle field, for example through integrated force sensors, mechanical triggers, or by the activation of a mechanical force-protection mechanism. The second condition may be distinct from the first condition, or may overlap in certain operational scenarios, depending on the design of the toothbrush and the characteristics of the stimulus-responsive material.

In embodiments, the method comprises, in response to the second condition, automatically inducing a reversible physical displacement of the bristle field. The displacement may comprises at least one of a rotational slip, a linear retraction, or an angular tilt. The physical displacement may take the form of a rotational slip, in which the bristle field rotates relative to the drive shaft; a linear retraction, in which the bristle field moves axially away from the drive unit; or an angular tilt, in which the bristle field pivots relative to its normal orientation. The specific mode of displacement may be determined by the configuration of the mechanical force-protection mechanism incorporated within the toothbrush head.

The reversible nature of both the decrease in bristle stiffness and the physical displacement ensures that the protective responses are only active during periods of excessive pressure or force, and that normal operation is restored once safe brushing conditions resume. This method provides a dual-layered approach to regulating brushing force, combining adaptive bristle properties with mechanical displacement to enhance user safety and comfort while maintaining effective oral hygiene.

The method may be implemented in electric toothbrushes equipped with suitable stimulus-responsive bristle materials and mechanical force-protection mechanisms. The detection of the first and second conditions, as well as the activation of the corresponding protective responses, may be achieved through passive material properties, integrated sensors, or a combination of both. The method is compatible with a range of toothbrush head and handle designs, and may be tailored to suit different user preferences or oral care requirements.

In embodiments, the first condition may comprise an increase in the temperature of the bristles to an oral temperature. Temperature-based adaptation provides automatic protection without requiring user action or electronic systems.

In embodiments, the first condition may comprise the application of mechanical force to the bristles exceeding a first pressure threshold. Force-based adaptation provides immediate response to aggressive brushing, preventing damage before it occurs.

In embodiments, the second condition may comprise the application of a tip force exceeding 150 grams. This specific threshold ensures protection activates at clinically relevant force levels associated with potential gum damage.

In embodiments, the step of inducing the reversible physical displacement may comprise causing a magnetic clutch to slip rotationally. Magnetic clutch slippage provides precise, consistent force limitation with tactile feedback.

In embodiments, the step of inducing the reversible physical displacement may comprise causing the bristle field to retract linearly by a distance between 1.0 mm and 2.0 mm. This specific retraction distance provides noticeable feedback while maintaining brush stability.

In embodiments, the step of inducing the reversible physical displacement may comprise causing the bristle field to tilt at an angle between 10 degrees and 15 degrees. This controlled tilt automatically optimizes brush orientation against teeth while protecting gums.

In embodiments, the method may further comprise the step of generating a user-perceptible feedback signal in response to the second condition. Additional feedback promotes learning of proper brushing technique through reinforcement.

In embodiments, generating the user-perceptible feedback signal may comprise emitting a pulse of light from an LED. Visual feedback provides clear, unmistakable indication of excessive pressure that complements tactile cues.

In embodiments, the method may further comprise, in response to the second condition, releasing a burst of fluid or air from the electric toothbrush head. This feature maintains cleaning efficacy even when mechanical motion is limited due to excessive pressure.

In a fourth aspect, the present disclosure relates to a method of manufacturing an electric toothbrush head.

In embodiments, the method comprises forming a plurality of bristles from a stimulus-responsive material. The material may be selected to provide a reversible decrease in stiffness in response to a first condition indicative of excessive brushing pressure. Accordingly, the method begins with the selection and preparation of a stimulus-responsive material suitable for forming the bristles. The stimulus-responsive material is chosen such that it is capable of undergoing a reversible decrease in stiffness when exposed to a first condition, which may be, for example, excessive brushing pressure. Suitable materials may include, but are not limited to, shape-memory polymers, thermoresponsive polymers, piezoelectric composites, or magneto-rheological elastomers. The material may be selected based on its ability to respond to a specific stimulus, such as an increase in temperature to oral temperature, the application of mechanical force exceeding a threshold, or exposure to a magnetic field, resulting in a temporary reduction in modulus or rigidity. Once the appropriate material is selected, the plurality of bristles is formed using conventional bristle manufacturing techniques. These may include extrusion, moulding, or cutting processes, depending on the nature of the stimulus-responsive material and the desired bristle geometry. The bristles may be produced in various lengths, diameters, and cross-sectional shapes to suit the intended cleaning performance and user comfort. In some embodiments, the bristles may be further processed to include features such as tapered tips, hydrogel cap tips, or surface texturing.

The method may comprise mounting the plurality of bristles to form a bristle field on a head chassis. The head chassis serves as the structural base for the bristle field and provides the interface for attachment to the remainder of the toothbrush head assembly. Mounting of the bristles may be achieved by inserting the bristle tufts into apertures in the chassis and securing them by heat-staking, ultrasonic welding, adhesive bonding, or mechanical anchoring. The arrangement of the bristle field may be tailored to provide optimal cleaning coverage and to facilitate the adaptive response of the bristles under varying brushing conditions.

The method may comprise integrating the head chassis with a mechanical force-protection mechanism configured to induce a reversible physical displacement of the bristle field in response to a second condition indicative of excessive brushing force. Said displacement comprises at least one of a rotational slip, a linear retraction, or an angular tilt. Integration of the force-protection mechanism may involve assembling components such as a clutch (for rotational slip), a spring-mounted subassembly (for linear retraction), or a compliant joint or hinge (for angular tilt) into the head chassis. The mechanism may be designed to activate when a second condition, such as excessive brushing force, is detected, thereby allowing the bristle field to move in a manner that reduces the transmission of excessive force to the user's teeth and gums.

The assembly process may include aligning and securing the mechanical force-protection mechanism within the head chassis, ensuring that the bristle field is operably coupled to the mechanism and that the intended displacement modes are achievable under the specified force conditions. Quality control steps may be implemented to verify the responsiveness of the bristles to the first condition and the correct operation of the force-protection mechanism under simulated brushing forces.

The resulting electric toothbrush head produced by this method is capable of providing adaptive protection against excessive brushing pressure and force, thereby enhancing user safety and comfort while maintaining effective cleaning performance. The method is compatible with a range of toothbrush head designs and may be adapted to incorporate additional features, such as feedback generators, hydrogel cap tips, or telescopic bristle anchors, depending on the desired functionality and application.

In embodiments, the step of forming the plurality of bristles may comprise forming the bristles from a shape-memory polymer. Shape-memory polymers provide reliable, repeatable stiffness changes with minimal manufacturing complexity.

In embodiments, the step of forming the plurality of bristles may comprise embedding ferromagnetic particles into an elastomeric polymer, and further comprising integrating a magnetic field generator into the head chassis proximate to the bristle field. This approach enables precise electronic control of bristle stiffness in response to real-time conditions.

In embodiments, the step of integrating the mechanical force-protection mechanism may comprise assembling a magnetic torque micro-clutch configured for rotational slip. This mechanism provides precise, calibrated force limitation with minimal wear over time.

In embodiments, the method may further comprise calibrating the magnetic torque micro-clutch to slip at an equivalent tip force between 160 grams and 200 grams. This specific calibration range ensures consistent protection at clinically relevant force thresholds.

In embodiments, the step of integrating the mechanical force-protection mechanism may comprise assembling a spring-mounted subassembly configured for linear retraction. This approach provides clear tactile and visual feedback with reliable mechanical operation.

In embodiments, the step of integrating the mechanical force-protection mechanism may comprise assembling an eccentric cam and a compliant joint in a neck portion of the toothbrush head configured for angular tilt. This mechanism enables automatic adaptation to optimal brushing angles while protecting against excessive force.

In embodiments, the method may further comprise integrating a feedback generator into the toothbrush head, wherein the feedback generator is configured to be activated by the mechanical force-protection mechanism. Direct mechanical activation ensures reliable feedback without requiring complex sensors.

In embodiments, the feedback generator may comprise an LED and a microswitch or Hall effect sensor positioned to detect the physical displacement. This combination provides reliable electronic feedback with minimal components and power requirements.

In embodiments, the method may further comprise forming a transparent window in the head chassis to permit viewing of at least a portion of the mechanical force-protection mechanism. Visual confirmation enhances user understanding and trust in the protective features of the toothbrush.

In the aspects and embodiments described above, the stimulus-responsive bristles and the mechanical force-protection mechanism are advantageously combined. However, in alternative aspects and embodiments, a toothbrush head having only one of these safety features can be provided, such as:

In another aspect, the present disclosure relates to an electric toothbrush head for coupling to a drive unit, comprising: a bristle field having a plurality of bristles. The bristles may comprise a stimulus-responsive material configured to provide a reversible decrease in stiffness in response to a condition indicative of excessive brushing pressure.

In another aspect, the present disclosure relates to an electric toothbrush head for coupling to a drive unit, comprising: a mechanical force-protection mechanism. The force-protection mechanism may be configured to induce a reversible physical displacement of the bristle field relative to the drive unit in response to a condition indicative of excessive brushing force. Said displacement may comprise at least one of a rotational slip, a linear retraction, or an angular tilt.

Both of these aspects can each be combined with the corresponding features and embodiments disclosed above and elsewhere throughout the disclosure. Furthermore, corresponding electric toothbrushes, methods of automatically regulating brushing force applied by an electric toothbrush, and methods of manufacturing an electric toothbrush head can be provided.

Lastly, the present disclosure is not limited to electric toothbrushes and electric toothbrush heads. Rather, the disclosed concepts may also be provided in embodiments featuring a manual toothbrush, or simply "toothbrush" for short, a corresponding toothbrush head, as well as corresponding operating and manufacturing methods.

The terms used herein should generally be construed as understood by the average person skilled in the art, unless explicitly indicated otherwise. The following explanations may guide the understanding:

As used herein, and unless otherwise specified, the term "electric toothbrush head" refers to the portion of an electric toothbrush that is configured to couple with a handle or similar housing containing a drive unit, and that carries the bristles or cleaning elements. Examples of specific embodiments include interchangeable heads that snap onto a matching drive shaft, integrated one-piece heads, and varieties with a swivel or pivot interface. It is noted that the toothbrush head itself need not be electric, but designed to cooperate with an electric toothbrush.

As used herein, and unless otherwise specified, the term "bristle field" refers to an arrangement or grouping of individual bristles or cleaning filaments mounted on a head chassis. Examples of specific embodiments include bristles arranged in concentric rings, bristles arranged in linear rows, or multi-zone combinations of angled and straight filaments.

As used herein, and unless otherwise specified, the term "bristle" refers to an individual bristle strand or filament which is suitable for cleaning teeth or gums. Examples of specific embodiments include nylon filaments, polymer filaments infused with active agents, or micro-fiber filaments with specialized textured tips.

As used herein, and unless otherwise specified, the term "stimulus-responsive material" refers to a category of materials that undergo a reversible change in a mechanical or physical property upon exposure to a given stimulus, such as temperature, force, magnetic field, or electric field. Examples of specific embodiments include shape-memory polymers that soften above a certain temperature, piezoelectric composites that alter stiffness under an electric field, or magneto-rheological elastomers that change rigidity in the presence of a magnetic field.

As used herein, and unless otherwise specified, the term "excessive brushing pressure" refers to a level of applied force or pressure to the bristles that is higher than a desirable or recommended magnitude for safe and effective dental cleaning. Examples of specific embodiments include a threshold that triggers a softening response at a particular temperature caused by frictional heating or at a certain pressure measured by a pressure-sensitive element.

As used herein, and unless otherwise specified, the term "reversible decrease in stiffness" refers to a change in rigidity of a material or structure that can be undone or reversed when the triggering stimulus is removed or reduced. Examples of specific embodiments include a polymer that softens above a certain temperature but returns to a stiffer state when cooled, and an elastomer that increases in flexibility during a compressive load but stiffens again once that load is removed.

As used herein, and unless otherwise specified, the term "mechanical force-protection mechanism" refers to any mechanical assembly or feature incorporated into a toothbrush head to prevent or mitigate damage or excessive force by allowing or causing a structural response when a force threshold is exceeded. Examples of specific embodiments include clutch mechanisms that slip under high torque, tensioned spring subassemblies that retract, or joints configured to pivot or tilt.

As used herein, and unless otherwise specified, the term "excessive brushing force" refers to an applied force on the toothbrush head beyond a recommended limit that could lead to undesirable outcomes, such as gum irritation or damage to the toothbrush. Examples of specific embodiments include forces above a set load threshold, such as 150 grams, 180 grams, or other calibrated force levels chosen based on safety guidelines.

As used herein, and unless otherwise specified, the term "reversible physical displacement" refers to a movement or shift of the bristle field or assembly that can return to an original position once the excessive force is reduced or removed. Examples of specific embodiments include a rotational slip facilitated by a clutch, a linear retraction enabled by a spring mechanism, or an angular tilt facilitated by a pivot joint.

As used-herein, and unless otherwise specified, the term "rotational slip" refers to a partial or full rotation of a brush head or subassembly relative to its drive shaft or anchoring point, triggered by a threshold torque or force, and then returning to its initial rotational alignment after the force is reduced. Examples of specific embodiments include friction-based clutches, magnetic torque micro-clutches, and ratchet-style detents that allow for limited rotation.

As used herein, and unless otherwise specified, the term "linear retraction" refers to a substantially straight-line movement of the bristle field or mounting subassembly away from the user's teeth or gums in response to an applied force, with the capability of returning to its original position once the force subsides. Examples of specific embodiments include springs, elastomeric couplings, and telescopic guides allowing travel distances in a defined range, such as 1.0 mm to 2.0 mm.

As used herein, and unless otherwise specified, the term "angular tilt" refers to a pivoting or bending motion of the toothbrush head or a portion thereof around an axis, enabling the bristle field to assume a new angular position and return to its original orientation when the excessive force is relieved. Examples of specific embodiments include pivot joints located in the neck region, flexure-based pivot mechanisms, and eccentric cam systems with elastic couplings.

As used herein, and unless otherwise specified, the term "shape-memory polymer" refers to a polymeric material capable of being deformed at one set of conditions (e.g., temperature) and then returning to its original shape when those conditions are changed. Examples of specific embodiments include polyurethane-based shape-memory resins, thermoplastic polyurethane elastomers, polycaprolactone-based blends, and other formulations designed to transition between different stiffness states in response to temperature changes.

As used herein, and unless otherwise specified, the term "piezoelectric composite" refers to a composite material containing one or more piezoelectric phases—such as piezoceramic particles-embedded in a polymer or other matrix, such that the composite changes mechanical properties in response to an electric field or mechanical stress. Examples of specific embodiments include polyvinylidene fluoride (PVDF) blends with ceramic inclusions, flexible transducer films, and layered laminated structures.

As used herein, and unless otherwise specified, the term "magneto-rheological elastomer" refers to an elastomer matrix embedded or loaded with magnetic particles that cause reversible changes in the material's stiffness or viscosity under an applied magnetic field. Examples of specific embodiments include silicone rubber loaded with iron microparticles, natural rubber doped with neodymium powder, and hybrid polymer-metal suspensions formulated to provide controllable stiffening in response to an external magnetic field.

As used herein, and unless otherwise specified, the term "magnetic field generator" refers to any device or assembly that produces a magnetic field in the vicinity of the bristles, thereby influencing a magneto-rheological elastomer or other magnetically responsive material. Examples of specific embodiments include small permanent magnets, electromagnets powered by the toothbrush's power source, and adjustable solenoid systems.

As used herein, and unless otherwise specified, the term "effective tip stiffness" refers to the overall rigidity or resistance to deflection exhibited by the bristle tips as a functional measurement under given conditions, such as temperature or applied field. Examples of specific embodiments include measured values in a range of stiffness reduction percentages, such as a decrease of at least 40 percent between 22° C. and 37° C.

As used herein, and unless otherwise specified, the term "clutch mechanism" refers to an assembly that allows selective transmission of torque or rotational movement and disengages automatically under excessive load to protect components. Examples of specific embodiments include friction-based rotary clutches, magnetic torque clutches, and ratchet-spring clutches designed to slip when encountering torque beyond a certain threshold.

As used herein, and unless otherwise specified, the term "magnetic torque micro-clutch" refers to a compact clutch mechanism employing magnetic coupling elements to control torque transmission, allowing for a slip or disengagement state when a designated torque level is exceeded. Examples of specific embodiments include magnet pairs with calibrated gaps, multiple-pole magnetic arrays, or embedded magnetic particles arranged to slip at a specified load range, such as between 160 grams and 200 grams of equivalent tip force.

As used herein, and unless otherwise specified, the term "spring-mounted subassembly" refers to a loosely or rigidly guided structural arrangement wherein a spring or other elastic element controls and supports the movement of the bristle field or related component. Examples of specific embodiments include coil springs, leaf springs, elastomeric rings, and compression assemblies offering variable travel distances to accommodate a linear retraction.

As used herein, and unless otherwise specified, the term "viscoelastic dashpot cartridge" refers to a damping component that provides resistance proportional to the rate of displacement and is commonly used in conjunction with a spring to manage sudden or rapid movements. Examples of specific embodiments include small oil-filled cylinders, silicone fluid-based dashpots, and polymeric shock absorbers integrated into a subassembly to deliver progressively increasing resistance.

As used herein, and unless otherwise specified, the term "eccentric cam" refers to a cam device where the rotational axis differs from the geometric center, resulting in controlled variable displacement when it rotates or engages. Examples of specific embodiments include off-center circular cams, lobed cams, and multi-lobed profiles used to impart an angular tilt or to provide specific mechanical advantage.

As used herein, and unless otherwise specified, the term "compliant joint" refers to a flexible or semi-flexible connection that allows relative motion between connected components under load. Examples of specific embodiments include living hinges made of polymer, elastomeric couplings, or pivoting elements with an integrated spring characteristic.

As used herein, and unless otherwise specified, the term "detent" refers to a feature or protrusion that mates with a corresponding recess or stop in order to provide tactile feedback or temporary locking when engaged. Examples of specific embodiments include ball-and-spring detent mechanisms, cam-to-follower detents, or small notches that create an audible click under engagement.

As used herein, and unless otherwise specified, the term "feedback generator" refers to any component or system that delivers a user-perceptible signal in response to a certain threshold or event, such as a physical displacement or force detection. Examples of specific embodiments include LEDs that illuminate, mini speakers or buzzers that emit an audible tone, vibrating motors that produce a tactile alert, or mechanical clickers that generate a noticeable sound.

As used herein, and unless otherwise specified, the term "hydrogel cap tips" refers to bristle tip portions composed partially or entirely of a hydrogel material that can swell or alter consistency under specific conditions, such as increased moisture, heat, or pressure. Examples of specific embodiments include polyacrylamide caps, polyethylene glycol-based gels, and hybrid polymeric tips that expand or soften in an aqueous environment.

As used herein, and unless otherwise specified, the term "telescopic spiral root anchors" refers to bristle mounting structures designed to extend or retract in a spiral or helical motion under a compressive or tensile load, returning to the original position when the load is removed. Examples of specific embodiments include interlocking helical tubes, threaded anchor rods capable of small axial extensions, and spiraling spring-loaded connectors.

As used herein, and unless otherwise specified, the term "transparent window" refers to a portion of the toothbrush head or chassis made from a translucent or transparent material that allows viewing of internal components or mechanisms. Examples of specific embodiments include polycarbonate windows, acrylic inserts, or specialized glass or ceramic sections integrated into the head assembly.

As used herein, and unless otherwise specified, the term "electric toothbrush" refers to a toothbrush assembly that includes a power-driven motor or drive unit in a handle portion and a removable or fixed toothbrush head portion configured to clean teeth. Examples of specific embodiments include rechargeable cordless toothbrushes, corded systems with external transformers, and battery-powered travel units.

As used herein, and unless otherwise specified, the term "handle" refers to the graspable body portion of an electric toothbrush or similar device that houses or supports a power source, motor, control electronics, or other functional systems. Examples of specific embodiments include cylindrical housings with an internal battery, ergonomic handles with textured grips, and contoured casings that also hold a recharging module.

As used herein, and unless otherwise specified, the term "drive unit" refers to the power-transmitting assembly within an electric toothbrush handle that generates the motion or rotary oscillation for the brush head. Examples of specific embodiments include small DC motors, magnetic-based oscillating drivers, linear actuators, or sonic vibration generators.

As used herein, and unless otherwise specified, the term "power source" refers to any device or component that provides electrical energy to operate the toothbrush. Examples of specific embodiments include rechargeable lithium-ion batteries, replaceable alkaline batteries, and inductively powered modules that receive energy from a charging dock.

As used herein, and unless otherwise specified, the phrase "burst of fluid or air" refers to a controlled release of liquid or gas from a reservoir or channel within a toothbrush head or handle, often triggered by a sensor or mechanical event. Examples of specific embodiments include a short pulse of water from a mini pump, a compressed air release from an internal canister, or a controlled spray of mouthwash solution from an onboard chamber.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

The above and other characteristics, features and advantages of the present disclosure will become apparent from the following detailed description, taken in conjunction with the accompanying drawings, which illustrate, by way of example, the principles of the disclosure. This description is given for the sake of example only, without limiting the scope of the disclosure.

BRIEF DESCRIPTION OF THE DRAWINGS

The present disclosure may be better understood by reference to the following drawings:

FIG. 2 illustrates a method of automatically regulating brushing force applied by an electric toothbrush in accordance with one embodiment.

FIG. 3 illustrates a method of manufacturing an electric toothbrush head in accordance with one embodiment.

DETAILED DESCRIPTION

Figure 1:
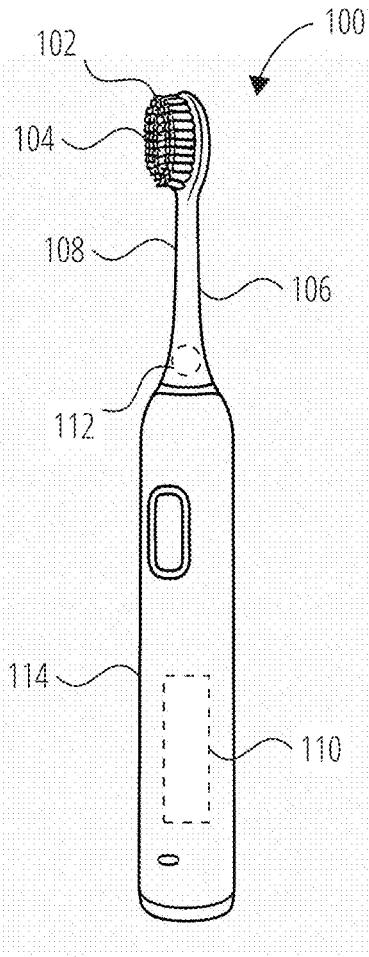
FIG. 1 is a schematic view of an electric toothbrush with a handle and a toothbrush head according to embodiments of the present disclosure.

In the following, representative embodiments illustrated in the accompanying drawings will be explained. It should be understood that the illustrated embodiments and the following descriptions refer to examples which are not intended to limit the embodiments to one preferred embodiment.

Embodiments concern an electric toothbrush and corresponding toothbrush head engineered to prevent over-brushing while preserving plaque removal efficacy via material-level adaptation, mechanical force limiting, automatic geometric alignment, or combinations thereof. Certain embodiments combine adaptive bristles, a calibrated magnetic slip clutch with LED coaching, an auto-tilting cam neck, and a spring/damper head to make the rule physical: the harder the user pushes, the more the brush protects, without sacrificing cleaning efficacy.

Embodiments of the electric toothbrush and toothbrush head disclosed herein may provide one or more of the following protective measurements, either individually or in combination:

- Level 1—Material adaptation: Bristle stiffness and contact softness change under load and at oral temperature.
- Level 2—Mechanical limiting: Magnetic micro-clutch slips at calibrated tip force; head subassembly retracts 1-2 mm to absorb spikes.
- Level 3—Geometric alignment & coaching: Neck auto-tilts 10-15° under torque; tactile "click"+brief LED pulse guide lighter technique.

System Overview

FIG. 1 illustrates an electric toothbrush 100 with a handle 114 and a toothbrush head 108 according to embodiments of the present disclosure. The handle 114 houses a drive unit 110. The toothbrush head 108 includes a neck portion 106 and a bristle field 102 with bristles 104.

In certain embodiments, the bristles 104 comprise a stimulus-responsive material configured to provide a reversible decrease in stiffness in response to a first condition indicative of excessive brushing pressure.

In certain embodiments, the toothbrush head 108 comprises a mechanical force-protection mechanism configured to induce a reversible physical displacement of the bristle field 102 relative to the drive unit 110 in response to a second condition indicative of excessive brushing force.

These features, individually or in combination, contribute to the toothbrush's ability to adapt to excessive brushing force, enhancing user comfort and protecting oral tissues.

Stimulus-Responsive Bristles

In certain embodiments, the first condition that triggers the reversible decrease in stiffness of the bristles may be an increase in temperature of the bristles to an oral temperature. For example, the stimulus-responsive material incorporated within the bristles can be selected such that it undergoes a change in mechanical properties, such as softening, when exposed to temperatures typically encountered within the oral cavity during brushing. This temperature-responsive behavior may be achieved by utilizing polymers or composite materials that exhibit a transition in modulus at or near human body temperature, for instance, in the range of approximately 30° C. to 40° C.

It is possible for the bristles to remain relatively stiff at ambient temperatures, such as those present during storage or handling, and to become more flexible once the toothbrush head is introduced into the mouth and the bristles are exposed to the elevated oral temperature. This reversible adaptation can provide enhanced comfort and protection for the user, as the bristles may yield more readily under pressure when softened by the warmth of the oral environment, thereby reducing the risk of excessive force being applied to teeth and gums.

Alternatively, the stimulus-responsive material may be engineered to respond to a specific temperature threshold, so that the decrease in stiffness only occurs when the bristles reach a predetermined temperature associated with oral use. In some configurations, the temperature sensitivity of the bristle material can be tailored by adjusting the composition or structure of the polymer, allowing for precise control over the activation point of the softening response.

Such temperature-responsive bristles may be implemented alone or in combination with other types of stimulus-responsive mechanisms, depending on the desired performance characteristics of the toothbrush head. The use of temperature as a trigger for the reversible decrease in stiffness offers a passive and reliable means of adapting the bristle properties to the oral environment, without the need for electronic sensors or active control systems.

In an alternative embodiment, the first condition that may trigger the reversible decrease in stiffness of the bristles can be the application of mechanical force to the bristles exceeding a first pressure threshold. In such a configuration, the stimulus-responsive material forming part or all of the bristles could be selected or engineered to respond to a defined level of compressive or bending force. When the force applied to the bristles during brushing surpasses this predetermined threshold, the material may undergo a physical or structural change that results in a temporary reduction in stiffness.

For instance, the bristle material might include polymers or composites that exhibit force-induced softening, such as those with reversible microstructural transitions or shear-thinning properties. Upon experiencing excessive brushing pressure, these materials may become more pliable, thereby allowing the bristles to flex more readily and reducing the risk of injury to oral tissues. Once the applied force drops below the threshold, the bristles may return to their original, stiffer state, thus restoring normal cleaning performance.

It is also conceivable that the bristles incorporate microcapsules, phase-change domains, or other engineered features that facilitate a reversible change in modulus when subjected to mechanical stress above a certain level. The pressure threshold at which the stiffness reduction occurs can be tailored during material selection or manufacturing, enabling adaptation to different user preferences or oral care requirements.

This force-responsive behavior may be implemented independently or in conjunction with other stimulus-responsive mechanisms, such as temperature sensitivity, to provide a multi-modal protective response. By enabling the bristles to adapt dynamically to excessive brushing force, this embodiment can contribute to improved user safety and comfort, while maintaining effective plaque removal under normal brushing conditions.

In some embodiments, the stimulus-responsive material incorporated within the bristles may be a shape-memory polymer. A shape-memory polymer is a type of polymeric material that can undergo a reversible change in its mechanical properties, such as stiffness or shape, in response to an external stimulus. This stimulus may include, for example, a change in temperature, the application of mechanical force, or exposure to moisture. When used in the context of an electric toothbrush head, a shape-memory polymer may be selected so that it provides a decrease in bristle stiffness under certain conditions, such as when the bristles are exposed to oral temperatures or when a threshold brushing force is applied. The use of a shape-memory polymer as the stimulus-responsive material can allow the bristles to temporarily soften or flex more readily when a specific stimulus is present, and then return to their original, stiffer configuration once the stimulus is removed. For instance, the shape-memory polymer may be engineered to have a transition temperature within the range typically encountered in the oral cavity, such as between 30° C. and 40° C. When the bristles are exposed to this temperature range during brushing, the polymer may transition to a softer state, thereby reducing the risk of excessive force being transmitted to the teeth and gums. Upon cooling to ambient temperature, the bristles may recover their initial stiffness, ensuring durability and effective cleaning performance during subsequent uses.

Alternatively, the shape-memory polymer may be formulated to respond to mechanical stress, such that the bristles become more flexible when subjected to forces exceeding a predetermined threshold. This force-induced softening can provide an additional layer of protection against overbrushing, as the bristles may yield more readily under excessive pressure and then revert to their original state once normal brushing conditions are restored.

It is also possible for the shape-memory polymer to be combined with other materials or additives to tailor its responsiveness and mechanical properties. For example, the bristles may comprise a blend of shape-memory polymer and conventional nylon, or may include reinforcing fillers to adjust the modulus and wear resistance. The selection and formulation of the shape-memory polymer can be adapted to achieve the desired balance between flexibility, resilience, and responsiveness to oral conditions.

The incorporation of a shape-memory polymer as the stimulus-responsive material in the bristles may be realized through various manufacturing techniques, such as co-extrusion, overmoulding, or embedding shape-memory polymer filaments within a matrix of standard bristle material. This approach offers a passive, reliable, and reversible means of adapting the bristle properties to changing brushing conditions, thereby enhancing user comfort and safety without the need for electronic sensors or active control systems.

In a further possible embodiment, the stimulus-responsive material incorporated within the bristles may comprise a piezoelectric composite. Such a piezoelectric composite can be selected so that it is capable of altering its mechanical properties, for example its stiffness, in response to mechanical or electrical stimuli encountered during brushing. The piezoelectric composite may include a polymer matrix, such as polyvinylidene fluoride (PVDF), in which piezoelectric ceramic particles or fibers are dispersed. Alternatively, the bristles may be formed from a blend of piezoelectric polymers and conventional bristle materials. The use of a piezoelectric composite as the stimulus-responsive material can enable the bristles to exhibit a reversible decrease in stiffness when subjected to a first condition, such as excessive brushing pressure or force. For instance, when a mechanical load is applied to the bristles during brushing, the piezoelectric effect may generate an internal electric field within the composite, which in turn could induce a change in the alignment or structure of the polymer chains, resulting in a temporary reduction in modulus. Once the load is removed or reduced below a certain threshold, the bristles may recover their original stiffness, thereby restoring normal cleaning performance.

In some configurations, the piezoelectric composite may be engineered to respond to specific pressure levels or frequencies of vibration, allowing the bristle response to be tailored to the operational characteristics of the electric toothbrush. It is also conceivable that the piezoelectric effect could be harnessed to provide a feedback signal, either passively or in conjunction with additional electronics, to further enhance user safety or brushing efficacy. However, in the context of a passive, self-regulating system, the primary function of the piezoelectric composite would be to enable the bristles to adapt their stiffness dynamically in response to brushing conditions, without the need for external power sources or active control mechanisms.

The incorporation of a piezoelectric composite into the bristles may be achieved through various manufacturing techniques, such as co-extrusion, melt blending, or surface coating. The proportion and distribution of the piezoelectric phase within the bristle material can be adjusted to achieve the desired balance between flexibility, responsiveness, and durability. In some instances, the piezoelectric composite may be combined with other stimulus-responsive materials, such as shape-memory polymers or thermoresponsive polymers, to provide a multi-modal adaptive response.

By utilizing a piezoelectric composite as the stimulus-responsive material, it is possible to provide bristles that can reversibly decrease in stiffness under excessive brushing pressure, thereby offering an additional layer of protection for the user's teeth and gums. This approach may be particularly advantageous in applications where a rapid, reversible, and passive adaptation of bristle properties is desired, and where integration with existing toothbrush head designs is required.

In a further embodiment, the stimulus-responsive material incorporated within the bristles may optionally be a magneto-rheological elastomer. A magneto-rheological elastomer is a composite material that can reversibly alter its mechanical properties, such as stiffness, in response to an applied magnetic field. The bristles may, for example, include a matrix of elastomeric polymer in which magnetizable particles, such as iron or ferrite particles, are dispersed. When exposed to a magnetic field, the alignment or interaction of these particles within the elastomer matrix can change, resulting in a rapid and reversible modification of the bristle stiffness.

It is also conceivable that the toothbrush head may further comprise a magnetic field generator, which could be configured to selectively alter the magnetic field applied to the bristles. The magnetic field generator may take various forms, such as a miniature electromagnet, a coil embedded within the head, or a permanent magnet that is movable or rotatable relative to the bristle field. In some possible configurations, the magnetic field generator may be integrated into the drive unit or the coupling interface, allowing for the field strength to be adjusted dynamically during operation. Alternatively, the magnetic field may be generated passively, for example by positioning a permanent magnet in proximity to the bristles, with the field strength being modulated by mechanical displacement or rotation.

By employing a magneto-rheological elastomer as the bristle material, it becomes possible to achieve a reversible decrease in stiffness when the magnetic field is adjusted in response to certain brushing conditions, such as excessive pressure or force. For instance, the system may be arranged so that, under normal brushing conditions, the magnetic field maintains the bristles in a relatively stiff state. If a threshold indicative of excessive brushing force is detected—either passively, through mechanical coupling, or actively, via a sensor—the magnetic field generator may be actuated to reduce the field strength, thereby causing the bristles to soften and flex more readily. Once the excessive force subsides, the magnetic field can be restored, returning the bristles to their original stiffness.

The use of a magneto-rheological elastomer in combination with a magnetic field generator offers several advantages, including rapid response time, precise control over bristle stiffness, and the ability to tailor the adaptive behaviour to individual user preferences or specific oral care requirements. This approach may be implemented alone or in conjunction with other stimulus-responsive materials, such as shape-memory polymers or piezoelectric composites, to provide a multi-modal protective response.

Manufacturing methods for such embodiments may include overmoulding or co-extrusion of the magneto-rheological elastomer into the bristle field, as well as integration of the magnetic field generator into the head or drive unit assembly. The design may be adapted to ensure compatibility with standard electric toothbrush drive units, while providing the additional benefit of adaptive bristle stiffness in response to magnetic field modulation. This arrangement may enhance user comfort and safety by reducing the risk of excessive force being transmitted to teeth and gums, particularly during periods of increased brushing pressure.

In a further possible embodiment, the reversible decrease in stiffness of the bristles may be realized as a reduction in effective tip stiffness of at least 40 percent when measured between 22° C. and 37° C. For example, the stimulus-responsive material incorporated within the bristles can be formulated so that, upon exposure to an increase in temperature from ambient conditions (such as 22° C.) to typical oral temperatures (such as 37° C.), the modulus of the bristle tips decreases substantially, resulting in a marked softening effect. This reduction in effective tip stiffness may be determined using standard mechanical testing methods, such as dynamic mechanical analysis or force-deflection measurements, applied to the bristle field under controlled temperature conditions.

It is conceivable that the degree of stiffness reduction can be tailored by adjusting the composition or structure of the stimulus-responsive material. In some instances, the material may be selected or engineered to provide a reduction in tip stiffness of at least 40 percent, or even greater, over the specified temperature range. Such a pronounced change in mechanical properties can enhance user comfort by allowing the bristles to yield more readily under pressure when warmed to oral temperature, thereby reducing the risk of excessive force being applied to teeth and gums.

Alternatively, the reversible decrease in stiffness may be achieved through the use of shape-memory polymers, thermoresponsive elastomers, or other materials that exhibit a significant modulus transition within the relevant temperature interval. The bristle design may be further optimised so that the softening effect is localised primarily at the bristle tips, where contact with oral tissues occurs, while maintaining sufficient rigidity at the base to ensure effective cleaning and durability.

In some configurations, the reduction in effective tip stiffness may be measured as a percentage decrease in force required to achieve a defined deflection of the bristle tip, comparing the values obtained at 22° C. and 37° C. The threshold of at least 40 percent reduction is intended as an example of a suitable performance characteristic, and other degrees of stiffness change may also be implemented depending on the specific requirements of the toothbrush head design.

By providing a bristle field with a reversible and substantial decrease in tip stiffness in response to temperature changes, it is possible to achieve a toothbrush head that adapts dynamically to the oral environment, offering improved safety and comfort for the user without compromising cleaning efficacy. This approach may be combined with other adaptive features, such as mechanical force-protection mechanisms or additional stimulus-responsive materials, to further enhance the protective and functional properties of the toothbrush head.

Mechanical Force-Protection Mechanism

In certain embodiments, the mechanical force-protection mechanism may be configured such that activation occurs when the second condition corresponds to an applied tip force exceeding 150 grams. For example, the mechanism can be designed or calibrated so that it responds to a threshold force applied at the bristle tips, with the threshold optionally set at or above 150 grams. This arrangement allows the force-protection mechanism to remain inactive during normal brushing, only engaging when the user applies a force that surpasses the predetermined limit.

It is also possible for the threshold force required to trigger the protective displacement—such as rotational slip, linear retraction, or angular tilt of the bristle field—to be adjustable or selectable during manufacture or assembly. In some configurations, the mechanism may employ a spring, friction clutch, or elastomeric coupling that is dimensioned or tensioned to yield or slip when the tip force reaches approximately 150 grams. Alternatively, the mechanism could utilize a deformable component or a magnetic detent that releases or shifts position under similar force conditions.

The selection of a tip force threshold around 150 grams may be based on clinical recommendations or user safety considerations, aiming to prevent excessive pressure from being transmitted to teeth and gums. However, other threshold values may also be implemented, depending on the intended user group or specific oral care requirements. The force-protection mechanism may be further refined to provide a gradual or progressive response as the applied force increases beyond the threshold, rather than a sudden or binary activation.

In some possible designs, the force-protection mechanism may be reset automatically once the applied force drops below the activation threshold, ensuring that the bristle field returns to its original position and the toothbrush head resumes normal operation. This reversible behavior can contribute to both user comfort and the longevity of the toothbrush head.

Overall, configuring the mechanical force-protection mechanism to activate at an applied tip force exceeding 150 grams represents one approach to enhancing the safety and adaptability of the electric toothbrush head. This feature may be implemented alone or in combination with other protective or adaptive elements, such as stimulus-responsive bristles, to provide a comprehensive response to excessive brushing force.

Mechanical Force-Protection Mechanism: Rotational Slip

In a further possible embodiment, the physical displacement of the bristle field relative to the drive unit may be realized as a rotational slip, and the mechanical force-protection mechanism can include a clutch mechanism. For example, the clutch mechanism may be arranged between the bristle field and the coupling interface of the toothbrush head, such that when an excessive brushing force is applied—such as a tip force exceeding a predetermined threshold—the clutch may permit the bristle field to rotate independently of the drive unit. This rotational slip can serve to dissipate excess force, thereby reducing the risk of transmitting damaging loads to the user's teeth and gums.

The clutch mechanism may take various forms, including but not limited to a friction clutch, a spring-loaded detent, or a ratcheting assembly. In some configurations, the clutch may be designed to engage only when the applied torque or axial force surpasses a set value, allowing normal transmission of rotational motion under typical brushing conditions. Once the threshold is exceeded, the clutch may temporarily disengage or slip, enabling the bristle field to rotate relative to the drive shaft. After the excessive force subsides, the clutch may automatically re-engage, restoring the original coupling and resuming standard operation.

Alternatively, the clutch mechanism could be implemented using elastomeric or viscoelastic materials that deform under load, providing a controlled and reversible slip response. In other arrangements, magnetic or fluid-based clutches might be employed to achieve similar protective effects. The selection and design of the clutch mechanism may be tailored to the specific requirements of the toothbrush head, such as the desired activation force, the range of permissible slip, and the durability of the components.

It is also conceivable that the rotational slip feature may be combined with other forms of displacement, such as linear retraction or angular tilt, to provide a multi-modal protective response. The clutch mechanism may be integrated into the base of the bristle field, within the mounting hub, or at the interface with the drive unit, depending on the overall design of the toothbrush head.

By incorporating a clutch mechanism capable of enabling rotational slip as a response to excessive brushing force, the toothbrush head may offer enhanced protection against overbrushing, while maintaining effective cleaning performance during normal use. This approach may be particularly advantageous in applications where a passive, mechanical safeguard is preferred, and where minimal impact on the user's brushing experience is desired.

In certain embodiments, the clutch mechanism may optionally be realized as a magnetic torque micro-clutch that is calibrated to slip at an equivalent tip force between 160 grams and 200 grams. Such a magnetic torque micro-clutch can be configured to provide a controlled and reversible rotational slip of the bristle field relative to the drive unit when the applied brushing force exceeds a predetermined threshold within this range. The use of magnetic coupling elements, such as miniature permanent magnets or magnetically responsive materials, may allow for precise adjustment of the slip torque, ensuring that the clutch activates only when necessary to protect oral tissues from excessive force.

It is conceivable that the magnetic micro-clutch could be integrated into the mounting hub of the toothbrush head or positioned at the interface between the bristle field and the drive shaft. The clutch may employ opposing magnetic poles arranged to provide a resistive torque under normal operating conditions. When the torque generated by excessive brushing force surpasses the calibrated limit—corresponding to a tip force between approximately 160 grams and 200 grams—the magnetic coupling may yield, permitting the bristle field to rotate independently of the drive unit. Once the applied force is reduced below the threshold, the magnetic attraction may re-engage the clutch, restoring normal operation without the need for manual intervention.

Alternatively, the magnetic torque micro-clutch may be designed to allow for gradual or progressive slip, rather than a sudden disengagement, thereby providing a smoother and more comfortable response for the user. The calibration of the slip threshold can be achieved by selecting appropriate magnet strengths, adjusting the spacing between magnetic elements, or incorporating additional mechanical features such as springs or damping materials to fine-tune the response.

In some possible configurations, the magnetic clutch mechanism may be combined with other protective or adaptive features, such as stimulus-responsive bristles or additional mechanical force-protection elements, to provide a comprehensive safety system. The use of a magnetic torque micro-clutch offers advantages including low wear, silent operation, and the ability to maintain consistent performance over repeated use cycles.

By optionally incorporating a magnetic torque micro-clutch calibrated to slip at a tip force between 160 grams and 200 grams, the electric toothbrush head may provide enhanced protection against overbrushing, while ensuring that cleaning efficacy and user comfort are maintained during normal brushing conditions. This approach allows for a passive, reliable, and maintenance-free means of limiting excessive force transmission to teeth and gums.

Mechanical Force-Protection Mechanism: Linear Retraction

In some possible embodiments, the physical displacement of the bristle field relative to the drive unit may take the form of a linear retraction, and the mechanical force-protection mechanism can include a spring-mounted subassembly. For example, the bristle field or its mounting hub may be supported within the toothbrush head by one or more springs, such as coil springs, leaf springs, or elastomeric spring elements. When an excessive brushing force is applied—such as a tip force exceeding a predetermined threshold—the spring-mounted subassembly may permit the bristle field to retract axially away from the drive unit, thereby absorbing or dissipating the excess force.

This linear retraction mechanism may be realized in a variety of ways. In one arrangement, the bristle field may be mounted on a sliding carriage or plunger that is biased towards its normal operating position by a compression spring. Under normal brushing conditions, the spring maintains the bristle field in firm engagement with the drive unit, ensuring efficient transmission of motion. If the applied force becomes excessive, the spring may compress, allowing the bristle field to move linearly away from the drive shaft. Once the force is reduced below the activation threshold, the spring may return the bristle field to its original position, restoring normal operation.

Alternatively, the spring-mounted subassembly could employ torsion springs or flexural elements that enable a combination of linear and slight angular movement, depending on the specific design requirements. The stiffness and travel of the spring elements may be selected or tuned to achieve the desired balance between user comfort, protective response, and cleaning efficacy. In some configurations, the spring mechanism may be adjustable, allowing for customization of the activation force to suit different user preferences or oral care needs.

It is also conceivable that the linear retraction feature may be combined with other forms of displacement, such as rotational slip or angular tilt, to provide a multi-modal protective response. The spring-mounted subassembly may be integrated into the base of the bristle field, within the mounting hub, or at the interface with the drive unit, depending on the overall architecture of the toothbrush head.

By incorporating a spring-mounted subassembly that enables linear retraction of the bristle field under excessive force, the toothbrush head may offer an additional layer of protection against overbrushing. This approach can help to reduce the risk of transmitting damaging loads to teeth and gums, while maintaining effective cleaning performance during normal use. The use of a spring-based mechanism also allows for a passive, reversible, and maintenance-free response, which may be particularly advantageous in applications where simplicity and reliability are desired.

In a further possible embodiment, the linear retraction of the bristle field relative to the drive unit may extend over a distance between 1.0 mm and 2.0 mm. For example, the spring-mounted subassembly supporting the bristle field can be configured so that, when an excessive brushing force is applied, the bristle field is permitted to move axially away from its normal position by an amount within this range. This retraction distance may be selected to provide an effective balance between user comfort and protective function, allowing sufficient movement to absorb or dissipate excessive force while maintaining the cleaning efficacy of the toothbrush head.

It is conceivable that the retraction distance could be determined by the design and stiffness of the spring or elastomeric elements used in the subassembly. In some arrangements, the mechanism may be engineered so that the maximum linear displacement of the bristle field does not exceed 2.0 mm, while ensuring that at least 1.0 mm of movement is available when the activation threshold is reached. Such a range of motion may be particularly advantageous in providing a perceptible yet controlled response to overbrushing, helping to prevent the transmission of excessive loads to teeth and gums.

Alternatively, the linear retraction distance may be adjustable, for instance by incorporating interchangeable springs or spacers, enabling the toothbrush head to be tailored to different user preferences or oral care requirements. The specific range of 1.0 mm to 2.0 mm may be chosen based on clinical studies or user feedback indicating that this degree of movement is sufficient to mitigate the risks associated with excessive brushing force without compromising the stability or durability of the head.

In some possible designs, the spring-mounted subassembly may include mechanical stops or limiters to ensure that the retraction distance remains within the desired range, thereby preventing over-extension or mechanical failure. The retraction mechanism may also be designed to return the bristle field smoothly and reliably to its original position once the excessive force subsides, ensuring consistent performance throughout the service life of the toothbrush head.

Overall, providing a linear retraction distance between 1.0 mm and 2.0 mm represents one possible approach to optimising the protective response of the toothbrush head, and may be implemented alone or in combination with other adaptive or safety features, depending on the intended application.

In a further embodiment, the spring-mounted subassembly may additionally include a viscoelastic dashpot cartridge configured to provide rate-dependent damping. The incorporation of a viscoelastic dashpot cartridge is intended to introduce a damping effect that varies according to the speed at which the linear retraction of the bristle field occurs. Such a dashpot cartridge may comprise a chamber filled with a viscoelastic material, such as silicone gel or a synthetic polymer, and a piston or plunger that moves within the chamber as the bristle field retracts or returns to its original position.

It is possible for the viscoelastic dashpot to be arranged in parallel with the spring element, so that both elastic and damping forces act on the bristle field during displacement. In this arrangement, the dashpot may resist rapid movements more strongly than slow ones, thereby providing greater damping when the bristle field is subjected to sudden or forceful impacts. This rate-dependent behavior can help to absorb shocks and prevent abrupt or excessive motion, enhancing user comfort and reducing the risk of mechanical wear or damage to the toothbrush head.

Alternatively, the dashpot cartridge could be integrated within the mounting hub or as part of the sliding carriage that supports the bristle field. The design of the dashpot may be tailored by selecting the viscosity and composition of the viscoelastic material, as well as the geometry of the piston and chamber, to achieve the desired damping characteristics. In some configurations, the damping effect may be adjustable, for example by providing interchangeable cartridges with different viscosities or by incorporating a variable orifice within the dashpot assembly.

The use of a viscoelastic dashpot cartridge in conjunction with a spring-mounted subassembly may also contribute to a smoother and more controlled return of the bristle field to its original position after the excessive force is removed. This can help to prevent oscillations or rebound effects that might otherwise occur with a purely elastic system. In some possible designs, the dashpot may be combined with other protective or adaptive features, such as stimulus-responsive bristles or additional mechanical safeguards, to further enhance the overall performance and safety of the toothbrush head.

Overall, the optional inclusion of a viscoelastic dashpot cartridge within the spring-mounted subassembly offers a means of providing rate-dependent damping during linear retraction of the bristle field. This approach may be particularly advantageous in applications where controlled, gradual movement and enhanced shock absorption are desired, contributing to improved durability and user experience.

Mechanical Force-Protection Mechanism: Angular Tilt

In another possible embodiment, the physical displacement of the bristle field relative to the drive unit may optionally be realized as an angular tilt, with the mechanical force-protection mechanism situated in a neck portion of the toothbrush head. The angular tilt refers to a movement in which the bristle field pivots or inclines relative to its normal orientation, typically about an axis transverse to the longitudinal axis of the toothbrush head. This tilting action may occur when an excessive brushing force is applied, allowing the bristle field to deflect away from the direction of the applied load and thereby reducing the transmission of excessive force to the user's teeth and gums.

The mechanical force-protection mechanism may, for example, be positioned within the neck region of the toothbrush head, which is the portion extending between the bristle field and the coupling interface with the drive unit. Locating the mechanism in the neck portion can provide a compact and effective means of enabling angular movement while maintaining the structural integrity and aesthetics of the toothbrush head. The mechanism itself may take various forms, such as a flexible hinge, a torsion spring, an elastomeric joint, or a ball-and-socket arrangement, any of which could permit controlled angular displacement of the bristle field when a threshold force is exceeded.

It is conceivable that the degree of angular tilt may be limited by mechanical stops or by the inherent elasticity of the force-protection mechanism, ensuring that the bristle field returns to its original position once the excessive force subsides. In some arrangements, the mechanism may be designed to provide a gradual or progressive tilting response, rather than a sudden movement, thereby enhancing user comfort and minimizing the risk of abrupt changes in brushing dynamics.

Alternatively, the angular tilt feature may be combined with other forms of displacement, such as linear retraction or rotational slip, to provide a multi-modal protective response. The force-protection mechanism in the neck portion may also be configured to work in conjunction with stimulus-responsive bristles, further enhancing the adaptability and safety of the toothbrush head.

The materials and construction of the neck portion and the associated mechanism may be selected to balance flexibility, durability, and resistance to wear. For example, the neck may be moulded from a resilient polymer or may incorporate embedded spring elements or elastomeric inserts to facilitate the desired angular movement. In some designs, the mechanism may be integrated seamlessly into the neck, preserving the overall appearance and ergonomics of the toothbrush head.

By optionally providing an angular tilt of the bristle field through a force-protection mechanism located in the neck portion, it is possible to offer an additional layer of protection against overbrushing. This approach may help to reduce the risk of injury to oral tissues and improve the overall brushing experience, particularly for users who tend to apply excessive force during oral care routines.

In certain embodiments, the angular tilt of the bristle field relative to the longitudinal axis of the neck portion may be within a range of approximately 10 degrees to 15 degrees. For example, the mechanical force-protection mechanism located in the neck portion can be configured so that, when an excessive brushing force is applied, the bristle field is permitted to pivot or incline by an angle falling within this interval. This degree of angular movement may be selected to provide a perceptible yet controlled deflection, allowing the bristle field to yield sufficiently to absorb or redirect excessive force while maintaining effective cleaning contact with the teeth.

It is also conceivable that the mechanism enabling angular tilt could be designed to allow for a maximum tilt angle that does not exceed 15 degrees, while ensuring that at least 10 degrees of movement is available when the activation threshold is reached. The specific range of angular tilt may be determined by the geometry and material properties of the neck portion, as well as by the design of the hinge, spring, or elastomeric joint incorporated into the force-protection mechanism. In some arrangements, the angular displacement may be limited by integrated mechanical stops or by the elastic deformation of the neck material itself.

Alternatively, the angular tilt feature may be adjustable, for instance by providing interchangeable neck modules or by incorporating a mechanism with variable resistance, enabling the toothbrush head to be tailored to different user preferences or oral care requirements. The range of 10 degrees to 15 degrees may be chosen based on ergonomic studies or user feedback indicating that this degree of tilt is sufficient to mitigate the risks associated with excessive brushing force without compromising the stability or durability of the head.

In some possible designs, the angular tilt may occur about a single axis transverse to the longitudinal axis of the neck, or may involve a compound movement allowing for multi-directional deflection, depending on the configuration of the force-protection mechanism. The tilting action may be reversible, with the bristle field returning smoothly to its original orientation once the excessive force subsides, thereby ensuring consistent performance and user comfort.

Overall, providing an angular tilt of between 10 degrees and 15 degrees relative to the longitudinal axis of the neck portion represents one possible approach to optimizing the protective response of the toothbrush head. This feature may be implemented alone or in combination with other adaptive or safety mechanisms, depending on the intended application and desired performance characteristics.

In a further possible embodiment, the mechanical force-protection mechanism located in the neck portion may comprise an eccentric cam and a compliant joint. For example, it is conceivable that the force-protection mechanism could include an eccentric cam element positioned within the neck region of the toothbrush head. The eccentric cam may be arranged so that, when an excessive brushing force is applied to the bristle field, the cam rotates or shifts, thereby inducing an angular tilt of the bristle field relative to the longitudinal axis of the neck. This arrangement may allow the bristle field to pivot by a controlled amount, such as within a range of 10 degrees to 15 degrees, depending on the geometry of the cam and the overall design of the neck portion.

The compliant joint may optionally be provided in conjunction with the eccentric cam to facilitate smooth and reversible angular movement. Such a compliant joint could be realised as a flexible hinge, an elastomeric insert, or a living hinge formed integrally with the neck structure. The compliant joint may deform elastically when the cam is actuated by excessive force, allowing the bristle field to tilt and then return to its original orientation once the force subsides. In some arrangements, the compliant joint may also serve to limit the maximum angular displacement, ensuring that the tilt remains within a safe and effective range.

Alternatively, the eccentric cam and compliant joint may be configured so that the cam acts as a mechanical stop or guide, while the compliant joint provides the necessary flexibility for angular movement. The combination of these elements may be tailored to achieve a desired balance between resistance to tilting under normal brushing conditions and the ability to yield when excessive force is encountered. In certain designs, the cam profile and the stiffness of the compliant joint may be selected to provide a progressive or non-linear response, offering increased resistance as the tilt angle increases.

It is also possible for the eccentric cam and compliant joint arrangement to be integrated seamlessly into the neck portion, preserving the overall aesthetics and ergonomics of the toothbrush head. The materials used for the cam and joint may include engineering plastics, elastomers, or composite materials, chosen for their durability, resilience, and compatibility with oral care applications.

This approach, employing an eccentric cam and a compliant joint as part of the mechanical force-protection mechanism, may be implemented alone or in combination with other protective or adaptive features, such as stimulus-responsive bristles or additional displacement mechanisms.

By providing a controlled and reversible angular tilt in response to excessive brushing force, this embodiment can enhance user safety and comfort, while maintaining effective cleaning performance during normal use.

In certain embodiments, the eccentric cam mechanism may optionally comprise at least one detent that is configured to provide tactile feedback upon engagement. The inclusion of a detent within the cam mechanism can serve to create a perceptible resistance or "click" as the cam rotates or shifts position in response to excessive brushing force. This tactile feedback may be experienced by the user as a slight sensation or interruption in the motion of the toothbrush head, thereby signaling that the force-protection mechanism has been activated.

The detent may, for example, be realized as a recess, notch, or protrusion formed on the surface of the eccentric cam, which interacts with a corresponding feature on an adjacent component, such as a spring-loaded ball, a flexible tab, or a compliant arm.

When the cam rotates to a certain position under load, the detent feature may engage, producing a temporary increase in resistance followed by a release as the cam moves past the detent. This arrangement can provide a clear and repeatable indication to the user that the angular tilt mechanism has responded to excessive force.

Alternatively, multiple detents could be incorporated into the cam profile, allowing for several discrete positions or levels of feedback as the bristle field tilts through its range of motion. The strength and character of the tactile feedback may be tailored by adjusting the geometry of the detent and the stiffness of the interacting components. In some designs, the detent mechanism may also serve to temporarily hold the cam in a tilted position until the applied force is reduced, after which the compliant joint may return the bristle field to its original orientation.

It is also possible for the detent to be combined with audible feedback, such as a faint click or snap, further enhancing the user's awareness of the protective function. The materials used for the detent and associated components may include engineering plastics, elastomers, or metals, selected for their durability and ability to withstand repeated cycling.

The provision of a detent within the eccentric cam mechanism is not essential in all embodiments, but may be advantageous in applications where user feedback is desired to reinforce safe brushing habits or to provide reassurance that the force-protection mechanism is functioning as intended. This feature may be implemented alone or in conjunction with other adaptive or protective elements, depending on the overall design objectives of the toothbrush head.

Feedback Generator

In some embodiments, the electric toothbrush head may additionally include a feedback generator that is configured to provide a user-perceptible signal upon the inducement of the physical displacement of the bristle field relative to the drive unit. The feedback generator can be realized in a variety of forms, and its inclusion is intended to enhance user awareness of the activation of the force-protection mechanism.

For example, the feedback generator may be arranged to emit a tactile signal, such as a vibration or a brief pulse, when the mechanical force-protection mechanism is triggered and the bristle field undergoes displacement—whether by rotational slip, linear retraction, or angular tilt. This tactile feedback may be produced by a miniature vibration motor, a piezoelectric actuator, or a mechanical element such as a spring-loaded detent or cam that generates a perceptible "click" or resistance when engaged.

Alternatively, the feedback generator could be configured to provide an audible signal, such as a soft click, snap, or tone, to alert the user that excessive brushing force has been detected and the protective mechanism has been activated. In some possible arrangements, the audible feedback may result from the interaction of mechanical components within the head, such as a detent engaging with a cam or a compliant element snapping into place. In other variants, an electronic sounder or buzzer may be incorporated into the toothbrush head or handle, activated by a sensor that detects the displacement event.

It is also conceivable that the feedback generator may deliver a visual signal, for instance by illuminating an indicator light or LED on the toothbrush head or handle when the physical displacement occurs. Such a visual cue may be especially useful in models where the toothbrush head communicates with the drive unit or handle via electrical contacts or wireless means.

The feedback generator may be designed to operate passively, relying solely on the mechanical action of the displacement mechanism, or it may be actively controlled by an electronic circuit that monitors the status of the force-protection system. In some configurations, the feedback generator may be adjustable or selectable by the user, allowing for customization of the type or intensity of the signal provided.

Providing a user-perceptible signal upon activation of the physical displacement mechanism can help to reinforce safe brushing habits by alerting the user when excessive force is being applied. This feature may be implemented alone or in combination with other adaptive or protective elements, depending on the desired functionality and user experience of the electric toothbrush head.

In certain embodiments, the user-perceptible signal generated by the feedback generator may optionally be realized as at least one of a visual signal from an LED, a tactile signal such as a click or a patterned vibration, or an audible signal. For example, it is possible for the toothbrush head to include a light-emitting diode (LED) that illuminates or flashes when the physical displacement of the bristle field occurs, thereby providing a clear visual indication to the user that the force-protection mechanism has been activated. The LED may be positioned on the toothbrush head itself or, in some configurations, on the handle, and may emit light in a distinctive color or pattern to attract the user's attention.

Alternatively, or in addition, the feedback generator can be arranged to deliver a tactile signal. This tactile feedback may take the form of a mechanical click, which could be produced by a detent or cam mechanism engaging during the displacement event. In other possible arrangements, a patterned vibration may be generated, for instance by a miniature vibration motor or a piezoelectric actuator integrated within the head or handle. Such tactile cues may be perceived directly through the user's grip or via the bristle field, providing an immediate and intuitive indication that excessive brushing force has been detected.

It is also conceivable that the feedback generator may be configured to emit an audible signal. This audible feedback could be realised as a soft click or snap resulting from the engagement of mechanical components, or as an electronically generated tone or beep produced by a sounder or buzzer. The audible signal may be designed to be subtle so as not to disturb the user, yet sufficiently distinct to serve as an effective alert.

Any one or a combination of these feedback modalities may be implemented, depending on the specific design and intended user experience of the toothbrush head. In some variants, the type or intensity of the user-perceptible signal may be selectable or adjustable, allowing users to tailor the feedback to their personal preferences. The provision of visual, tactile, or audible signals as possible feedback options can enhance user awareness and promote safer brushing habits by clearly indicating when the protective features of the toothbrush head are engaged.

Hydrogel Cap Tips

In some embodiments, the plurality of bristles may additionally include hydrogel cap tips that are configured to swell under compressive load. The hydrogel cap tips can be formed by applying or moulding a hydrogel material onto the distal ends of the bristles, either as a continuous coating or as discrete caps. Hydrogels suitable for this purpose may comprise crosslinked polymer networks capable of absorbing water or saliva from the oral environment, thereby increasing in volume when subjected to pressure during brushing.

It is conceivable that, when a compressive force is applied to the bristle tips—such as when the user presses the toothbrush head against the teeth or gums—the hydrogel caps may undergo a reversible swelling process. This swelling can result in a temporary increase in the contact area between the bristle tips and the oral surfaces, potentially enhancing cleaning efficacy while simultaneously distributing the applied force more evenly. As a result, the risk of localised pressure points or abrasion may be reduced, contributing to improved comfort and safety for the user.

Alternatively, the hydrogel cap tips may be engineered to exhibit a controlled rate of swelling, such that the expansion occurs primarily under sustained or excessive compressive loads. In this way, the hydrogel material may act as a passive, adaptive cushion that responds dynamically to brushing conditions. The degree of swelling, as well as the mechanical properties of the hydrogel, can be tailored by adjusting the polymer composition, crosslink density, or the incorporation of additives to achieve the desired balance between softness, resilience, and durability.

In some possible configurations, the hydrogel caps may be selectively applied only to certain bristles within the bristle field, for example to those located at the periphery or in regions most likely to experience higher loads. Alternatively, all bristles may be provided with hydrogel tips, or the hydrogel material may be combined with other tip treatments, such as polishing or texturing, to further enhance cleaning performance and user comfort.

The use of hydrogel cap tips that swell under compressive load may be implemented alone or in conjunction with other adaptive or protective features of the toothbrush head, such as stimulus-responsive bristle materials or mechanical force-protection mechanisms. This approach offers a further means of providing a gentle, responsive interface between the toothbrush and the oral tissues, adapting in real time to the forces encountered during brushing. The hydrogel caps may be designed to return to their original size and shape once the compressive load is removed, ensuring consistent performance throughout repeated use cycles.

Telescopic Spiral Root Anchors

In certain embodiments, the plurality of bristles may be mounted on telescopic spiral root anchors that are configured to reversibly extend under compressive load. The use of telescopic spiral root anchors represents one possible approach to providing adaptive movement of the bristles in response to forces encountered during brushing. Such anchors can be realized as helical or spiral-shaped bases, optionally formed from resilient polymeric or metallic materials, which are capable of telescoping or unwinding to increase their effective length when a compressive force is applied to the bristle tips.

It is conceivable that, during brushing, when the user presses the toothbrush head against the teeth or gums, the compressive load may cause the spiral root anchors to extend, thereby allowing the bristles to protrude further from the base of the head. This reversible extension can serve to absorb excess force, reducing the risk of transmitting damaging loads to oral tissues and enhancing user comfort. Once the compressive load is relieved, the spiral anchors may return to their original, retracted configuration, restoring the initial bristle length and orientation.

Alternatively, the telescopic spiral root anchors may be designed to provide a progressive extension, with the degree of elongation increasing in proportion to the applied force. This behaviour may be achieved by selecting the pitch, diameter, and material properties of the spiral structure to yield a desired force-extension profile. In some possible arrangements, the spiral anchors may be integrated into the mounting hub of the toothbrush head, or may be formed as part of individual bristle sockets, allowing for independent movement of each bristle or groups of bristles.

It is also possible for the telescopic spiral root anchors to be combined with other adaptive features, such as stimulus-responsive bristle materials, hydrogel cap tips, or mechanical force-protection mechanisms, to provide a multi-layered response to varying brushing conditions. The spiral anchors may be manufactured using techniques such as micro-moulding, co-extrusion, or additive manufacturing, depending on the desired scale and complexity of the structure.

In some variants, the spiral root anchors may be configured to provide not only linear extension but also a slight rotational or pivoting movement of the bristles, further enhancing the adaptability of the bristle field to the contours of the teeth and gums. The materials used for the anchors may be selected for their resilience, fatigue resistance, and compatibility with oral care applications, ensuring reliable performance over repeated use cycles.

Overall, the optional inclusion of telescopic spiral root anchors for mounting the bristles offers a means of providing reversible extension of the bristle field under compressive load. This feature may contribute to improved force distribution, enhanced cleaning efficacy, and greater user comfort, particularly in situations where variable brushing forces are encountered. The design may be tailored to suit different toothbrush head geometries and user preferences, and may be implemented alone or in combination with other protective or adaptive elements.

Transparent Window

In some embodiments, the electric toothbrush head may additionally include a transparent window that is configured to permit viewing of at least a portion of the mechanical force-protection mechanism. The transparent window may be formed from a clear polymeric material, such as polycarbonate or acrylic, and may be integrated into the housing of the toothbrush head at a location that provides visual access to the internal components associated with the force-protection mechanism. For example, the window could be positioned along the side of the neck portion, at the base of the bristle field, or in another suitable region where the movement or operation of the mechanism can be observed.

It is also conceivable that the transparent window may be realized as a discrete insert, a molded section of the head, or as a continuous band encircling part of the housing. The size, shape, and placement of the window may be selected according to design preferences, manufacturing considerations, or the specific configuration of the mechanical force-protection mechanism. In some possible arrangements, the window may be dimensioned to allow the user to monitor the activation or movement of elements such as a clutch, spring-mounted subassembly, eccentric cam, or compliant joint, thereby providing a visual indication of the protective function in operation.

Alternatively, the transparent window may serve an educational or reassurance purpose, enabling users to gain confidence in the presence and functionality of the adaptive safety features. In certain variants, the window could be combined with visual indicators, such as coloured markings or moving elements, to further enhance the clarity of the feedback provided to the user. The transparent material may be selected for its durability, resistance to cleaning agents, and optical clarity, ensuring that the window remains clear and functional throughout the service life of the toothbrush head.

In some designs, the transparent window may be provided as a removable or replaceable component, allowing for maintenance or inspection of the underlying mechanism if desired. It is also possible for the window to be incorporated as part of a decorative or branding feature, contributing to the overall aesthetics of the toothbrush head while retaining its functional role.

The inclusion of a transparent window to permit viewing of the mechanical force-protection mechanism is not essential in all embodiments, but may be advantageous in applications where user engagement, product differentiation, or enhanced feedback is desired. This feature may be implemented alone or in conjunction with other adaptive or protective elements, depending on the intended user experience and design objectives of the electric toothbrush head.

Drive Unit

In some embodiments, the electric toothbrush may be arranged such that the drive unit is configured to momentarily reduce its operational intensity in response to the physical displacement of the toothbrush head. For example, it is possible for the drive unit to include a control circuit or processor capable of detecting when the toothbrush head undergoes a displacement event, such as rotational slip, linear retraction, or angular tilt, as may occur when a mechanical force-protection mechanism is activated. Upon detection of such an event, the drive unit may temporarily decrease its output, for instance by lowering the speed, torque, or amplitude of motion delivered to the toothbrush head.

Alternatively, the reduction in operational intensity may be achieved by modulating the power supplied to the drive motor, adjusting the duty cycle of a pulse-width modulated signal, or engaging a dedicated low-power mode for a brief interval. The duration and magnitude of the intensity reduction can be tailored according to user preferences, safety considerations, or the specific characteristics of the displacement mechanism. In some possible configurations, the drive unit may resume its normal operational intensity automatically once the displacement event has subsided and the toothbrush head has returned to its original position.

It is also conceivable that the drive unit may be equipped with sensors, such as force, position, or acceleration sensors, which are capable of detecting the occurrence of physical displacement in real time. In other arrangements, the toothbrush head itself may include a switch, contact, or wireless transmitter that communicates with the drive unit to signal when a displacement event has occurred. The control logic governing the intensity reduction may be implemented in hardware, software, or a combination of both, depending on the design requirements and available components.

In some variants, the momentary reduction in operational intensity may be accompanied by a user-perceptible signal, such as a brief pause, vibration, or audible tone, to further alert the user that excessive force has been detected and the protective features have been engaged. The system may also allow for customization of the response, enabling users to select the degree or duration of intensity reduction according to their individual needs or preferences.

By optionally providing a drive unit that is capable of momentarily reducing its operational intensity in response to the physical displacement of the toothbrush head, it is possible to further enhance user safety and comfort. This feature may help to prevent the continued application of excessive force during brushing, reduce the risk of injury to oral tissues, and reinforce proper brushing technique. The arrangement may be implemented alone or in combination with other adaptive or protective elements, depending on the intended functionality and user experience of the electric toothbrush.

Handle

In certain embodiments, the handle of the electric toothbrush may include a power source that is operably coupled to a feedback generator located on the toothbrush head. The power source can, for example, be a rechargeable battery, a replaceable battery, or a supercapacitor, and may be housed within the handle portion of the toothbrush. It is possible for the power source to be electrically connected to the feedback generator via conductive contacts, flexible wiring, or wireless power transfer methods such as inductive coupling.

The feedback generator positioned on the toothbrush head may be configured to provide a user-perceptible signal in response to specific operational events, such as the activation of a mechanical force-protection mechanism or the occurrence of excessive brushing force. In some arrangements, the feedback generator may comprise an LED, a miniature vibration motor, a piezoelectric actuator, or an audible sounder, any of which may be powered by the energy supplied from the handle's power source. The coupling between the power source and the feedback generator may be realized through direct electrical contacts at the interface between the handle and the head, or alternatively through wireless energy transfer, depending on the design of the toothbrush.

It is also conceivable that the power source in the handle may be arranged to supply energy to other active components located on the toothbrush head, such as sensors, microcontrollers, or communication modules, in addition to the feedback generator. In some possible configurations, the feedback generator may be activated automatically in response to signals from the drive unit, a sensor, or a control circuit, or may be user-selectable via controls on the handle or head.

Alternatively, the feedback generator may be designed to operate only when the toothbrush is in use, with the power source supplying energy during brushing sessions and entering a low-power or standby mode at other times to conserve battery life. The arrangement of the power source and feedback generator may be tailored to suit different toothbrush architectures, including those with detachable or permanently affixed heads.

By optionally providing a handle with a power source operably coupled to a feedback generator on the toothbrush head, it is possible to enhance the functionality and user experience of the electric toothbrush. This configuration may allow for more effective delivery of visual, tactile, or audible feedback to the user, supporting safer and more effective oral care routines. The specific implementation of the power source and feedback generator may be adapted according to performance requirements, manufacturing considerations, and user preferences.

Operating Method

FIG. 2 illustrates a method 200 of automatically regulating brushing force applied by an electric toothbrush in accordance with one embodiment.

In block 202, if the electric toothbrush is equipped with stimulus-responsive bristles, routine 200 detects a first condition indicative of excessive brushing pressure at a bristle field. In block 204, routine 200 in response to the first condition, automatically causes a reversible decrease in the stiffness of a plurality of bristles within the bristle field, wherein the bristles comprise a stimulus-responsive material.

In block 206, if the electric toothbrush is equipped with a force-protection mechanism, routine 200 detects a second condition indicative of excessive brushing force applied to the bristle field. In block 208, routine 200 in response to the second condition, automatically induces a reversible physical displacement of the bristle field. The displacement may comprise at least one of a rotational slip, a linear retraction, or an angular tilt.

Manufacturing Method

FIG. 3 illustrates a method 300 of manufacturing an electric toothbrush head in accordance with one embodiment. In block 302, routine 300 forms a plurality of bristles from a stimulus-responsive material, the material being selected to provide a reversible decrease in stiffness in response to a first condition indicative of excessive brushing pressure. In block 304, routine 300 mounts the plurality of bristles to form a bristle field on a head chassis. In block 306, routine 300 integrates the head chassis with a mechanical force-protection mechanism configured to induce a reversible physical displacement of the bristle field in response to a second condition indicative of excessive brushing force, wherein the displacement comprises at least one of a rotational slip, a linear retraction, or an angular tilt.

In one possible embodiment of the manufacturing method, the step of forming the plurality of bristles may involve producing the bristles from a shape-memory polymer. The use of a shape-memory polymer as the material for the bristles can be selected as an option to impart stimulus-responsive properties to the bristle field. Shape-memory polymers are a class of materials capable of undergoing a reversible change in their mechanical characteristics, such as stiffness or shape, in response to an external stimulus. This stimulus may include, for example, a change in temperature, the application of mechanical force, or exposure to moisture.

It is conceivable that, by forming the bristles from a shape-memory polymer, the bristles may exhibit a decrease in stiffness when exposed to a particular condition, such as an increase in temperature to a value typical of the oral environment or the application of excessive brushing pressure. For instance, the shape-memory polymer may be engineered to have a transition temperature within the range encountered during brushing, such as between 30° C. and 40° C. When the bristles are exposed to this temperature range, they may transition to a softer state, thereby providing a protective response against excessive force. Upon cooling or removal of the stimulus, the bristles may recover their original, stiffer configuration, ensuring durability and effective cleaning performance for subsequent uses.

Alternatively, the shape-memory polymer may be formulated to respond to mechanical stress, so that the bristles become more flexible when subjected to forces exceeding a predetermined threshold. This force-induced softening can provide an additional layer of protection, as the bristles may yield more readily under excessive pressure and then revert to their initial state once normal brushing conditions are restored.

The selection and formulation of the shape-memory polymer may be tailored to achieve the desired balance between flexibility, resilience, and responsiveness to oral conditions. For example, the bristles may comprise a blend of shape-memory polymer and conventional bristle materials, or may include reinforcing fillers to adjust the modulus and wear resistance. Manufacturing techniques such as co-extrusion, overmoulding, or embedding shape-memory polymer filaments within a matrix of standard bristle material may be employed to realise this embodiment.

Incorporating shape-memory polymers as the bristle material is one approach among several for providing a reversible decrease in stiffness in response to a first condition indicative of excessive brushing pressure. This option may be implemented alone or in combination with other stimulus-responsive materials or adaptive features, depending on the intended performance characteristics and application of the electric toothbrush head.

In some embodiments, the step of forming the plurality of bristles may optionally involve embedding ferromagnetic particles into an elastomeric polymer. For example, it is possible for the bristles to be manufactured from a base elastomeric material, such as a silicone or thermoplastic elastomer, into which finely divided ferromagnetic particles—such as iron, nickel, cobalt, or their alloys—are dispersed during compounding or moulding. The concentration, particle size, and distribution of the ferromagnetic material within the polymer matrix may be selected to achieve a desired balance between mechanical flexibility, magnetic responsiveness, and durability of the bristles.

By incorporating ferromagnetic particles, the bristles may be rendered responsive to external magnetic fields, enabling their mechanical properties—such as stiffness or alignment—to be influenced or modulated in situ. In certain possible arrangements, the ferromagnetic content may be localised to specific regions of the bristle, such as the tip or root, or may be distributed uniformly throughout the bristle structure. The selection of the elastomeric polymer and the type and loading of ferromagnetic particles may be tailored according to the intended performance characteristics, manufacturing considerations, and compatibility with oral care applications.

Additionally, it may be advantageous in some variants to integrate a magnetic field generator into the head chassis in proximity to the bristle field. The magnetic field generator could take various forms, such as a miniature electromagnet, a coil, or a movable permanent magnet, and may be positioned within or adjacent to the region of the head supporting the bristles. In certain configurations, the magnetic field generator may be arranged so that it is capable of selectively applying a magnetic field to the bristle field, thereby inducing a reversible change in the mechanical properties of the bristles, such as a decrease in stiffness or a change in orientation, in response to specific operational conditions.

The activation of the magnetic field generator may be controlled passively, for example by mechanical coupling to the force-protection mechanism, or actively, via electronic circuitry that responds to detected brushing force, pressure, or user input. In some possible designs, the strength and direction of the magnetic field may be adjustable, allowing for customisation of the bristle response to suit different user preferences or oral care requirements. The integration of a magnetic field generator in proximity to the bristle field may also facilitate additional features, such as the alignment of bristles for cleaning efficacy or the provision of user feedback through magnetic actuation.

It is also conceivable that the combination of ferromagnetic particle-embedded bristles and a magnetic field generator may be implemented alongside other adaptive or protective elements, such as stimulus-responsive polymers, mechanical force-protection mechanisms, or feedback generators, to provide a multi-modal response to varying brushing conditions. The manufacturing process for such embodiments may include steps such as compounding the elastomeric polymer with ferromagnetic particles, moulding or extruding the bristles, assembling the bristle field onto the head chassis, and installing the magnetic field generator in the desired location.

Overall, the optional inclusion of ferromagnetic particles within the bristle material, together with the possible integration of a magnetic field generator into the head chassis proximate to the bristle field, offers a further means of achieving adaptive, reversible control over bristle properties in response to operational stimuli. This approach may enhance the safety, comfort, and effectiveness of the electric toothbrush head, and may be tailored to a wide range of product designs and user needs.

In some embodiments, the step of integrating the mechanical force-protection mechanism may involve assembling a magnetic torque micro-clutch that is configured to permit rotational slip of the bristle field relative to the drive unit. The magnetic torque micro-clutch may be realised as a compact assembly positioned within the head chassis or at the interface between the bristle field and the coupling portion of the toothbrush head. This arrangement can optionally provide a means for the bristle field to rotate independently of the drive shaft when a threshold torque or force is exceeded, thereby serving as a protective feature against excessive brushing force.

The magnetic torque micro-clutch may, for example, comprise one or more pairs of miniature permanent magnets or magnetically responsive elements arranged to generate a resistive coupling under normal operating conditions. When the applied torque resulting from excessive brushing force surpasses a predetermined limit, the magnetic coupling may yield, allowing the bristle field to slip rotationally with respect to the drive unit. This slip action can be reversible, such that the clutch re-engages automatically once the excessive force subsides, restoring normal operation without the need for user intervention.

Alternatively, the micro-clutch may be designed to provide a gradual or progressive slip response, rather than a sudden disengagement, thereby offering a smoother and more comfortable experience for the user. The slip threshold of the clutch can be tailored by adjusting the strength, spacing, or configuration of the magnetic elements, or by incorporating additional features such as springs or damping materials to fine-tune the response. In some possible variants, the clutch mechanism may be integrated into the mounting hub of the bristle field or within the neck portion of the head, depending on the overall design and intended functionality.

It is also conceivable that the magnetic torque micro-clutch could be combined with other forms of mechanical force-protection, such as spring-mounted subassemblies or compliant joints, to provide a multi-modal adaptive response to excessive brushing force. The use of a magnetic clutch mechanism may offer advantages including low wear, silent operation, and consistent performance over repeated use cycles. In certain designs, the clutch may be configured to allow for a specific range of rotational slip before re-engagement, or may be adjustable to accommodate different user preferences or oral care requirements.

The assembly of the magnetic torque micro-clutch may be achieved using conventional manufacturing techniques, such as press-fitting, adhesive bonding, or snap-fit connections, and may be compatible with a variety of toothbrush head geometries and materials. The inclusion of such a clutch mechanism is not essential in all embodiments, but may be particularly advantageous in applications where a passive, maintenance-free safeguard against excessive rotational force is desired. This approach may be implemented alone or in conjunction with other adaptive or protective features, depending on the intended performance characteristics and user experience of the electric toothbrush head.

In certain embodiments, the method may further include the step of calibrating the magnetic torque micro-clutch so that it is configured to slip at an equivalent tip force within a range between 160 grams and 200 grams. This calibration process can be carried out during assembly or as a post-assembly adjustment, and may involve selecting or tuning the magnetic elements, such as permanent magnets or magnetically responsive components, to achieve the desired slip threshold. For example, the strength, orientation, or spacing of the magnetic elements may be adjusted so that the clutch disengages or permits rotational slip when the force applied at the bristle tips corresponds to a value within the specified range.

Alternatively, the calibration may be accomplished by incorporating additional mechanical features, such as springs, detents, or damping materials, which can be selected or modified to fine-tune the torque required for the clutch to slip. In some possible configurations, the clutch mechanism may be designed to allow for incremental or continuous adjustment, enabling the slip threshold to be set according to user preference, clinical recommendations, or specific oral care requirements.

It is also conceivable that the calibration step may be performed using a test fixture or measurement device that applies a controlled force to the bristle field while monitoring the onset of rotational slip. This approach may facilitate quality control and ensure consistency across production batches. In certain variants, the calibration may be carried out manually by an operator, or automatically by an assembly robot or integrated testing system.

The option to calibrate the magnetic torque micro-clutch to slip at a tip force between 160 grams and 200 grams may be advantageous in providing a balance between effective cleaning performance and user safety. By selecting a slip threshold within this range, it is possible to reduce the risk of excessive force being transmitted to teeth and gums, while still allowing for sufficient brushing action under normal conditions. The specific value chosen for the slip threshold may be tailored to suit different user groups, product models, or regulatory standards.

In some embodiments, the calibrated clutch may also be designed to provide a gradual or progressive slip response, rather than a sudden disengagement, thereby enhancing user comfort and minimising abrupt changes in brushing dynamics. The calibration process may be repeated or adjusted over the service life of the toothbrush head, if desired, to compensate for wear or changes in component properties.

Overall, the inclusion of a calibration step for the magnetic torque micro-clutch, enabling it to slip at an equivalent tip force within the range of 160 grams to 200 grams, represents one possible approach to optimising the protective function of the electric toothbrush head. This feature may be implemented alone or in combination with other adaptive or safety mechanisms, depending on the intended application and performance objectives.

In some embodiments, the integration of the mechanical force-protection mechanism may optionally involve assembling a spring-mounted subassembly that is configured to permit linear retraction of the bristle field relative to the head chassis. This spring-mounted subassembly can be realised in various forms, such as a compression spring, a leaf spring, or an elastomeric spring element, which may be positioned between the bristle field or its mounting hub and the main body of the toothbrush head. The spring element may be arranged so that, when an excessive brushing force is applied—such as a tip force exceeding a predetermined threshold—the bristle field is able to move axially away from its normal position, thereby absorbing or dissipating the excess force.

It is conceivable that the spring-mounted subassembly may include a sliding carriage, plunger, or telescoping structure that supports the bristle field and is biased towards its default position by the spring. Under typical brushing conditions, the spring may maintain the bristle field in firm engagement with the drive unit, ensuring efficient transmission of motion. If the applied force becomes excessive, the spring may compress or deform, allowing the bristle field to retract linearly by a controlled distance. Once the force is reduced below the activation threshold, the spring may return the bristle field to its original position, restoring normal operation.

Alternatively, the spring-mounted subassembly could employ torsion springs, flexural elements, or elastomeric couplings that enable a combination of linear and slight angular movement, depending on the specific design requirements. The stiffness and travel of the spring elements may be selected or tuned to achieve the desired balance between user comfort, protective response, and cleaning efficacy. In some configurations, the spring mechanism may be adjustable, allowing for customisation of the activation force or retraction distance to suit different user preferences or oral care needs.

It is also possible for the spring-mounted subassembly to be combined with additional features, such as damping elements or mechanical stops, to provide rate-dependent resistance or to limit the maximum retraction distance. For example, a viscoelastic dashpot or friction damper may be incorporated in parallel with the spring to absorb shocks and prevent abrupt or excessive movement. The integration of such features may further enhance the protective function and durability of the toothbrush head.

The spring-mounted subassembly may be integrated into the base of the bristle field, within the mounting hub, or at the interface with the drive unit, depending on the overall architecture of the toothbrush head. The materials used for the spring and associated components may include metals, engineering plastics, or elastomers, selected for their resilience, fatigue resistance, and compatibility with oral care applications.

By optionally providing a spring-mounted subassembly configured for linear retraction, it is possible to offer an additional layer of protection against overbrushing. This approach may help to reduce the risk of transmitting damaging loads to teeth and gums, while maintaining effective cleaning performance during normal use. The use of a spring-based mechanism also allows for a passive, reversible, and maintenance-free response, which may be particularly advantageous in applications where simplicity and reliability are desired. This feature may be implemented alone or in combination with other adaptive or protective elements, depending on the intended functionality and design objectives of the electric toothbrush head.

In a further possible embodiment of the method of manufacturing an electric toothbrush head, the step of integrating the mechanical force-protection mechanism may involve assembling an eccentric cam and a compliant joint within a neck portion of the toothbrush head, the assembly being configured to enable angular tilt of the bristle field relative to the drive unit. The inclusion of an eccentric cam and a compliant joint in the neck region is intended to provide a mechanism by which the bristle field can pivot or incline when subjected to excessive brushing force, thereby offering an additional layer of adaptive protection.

The eccentric cam may, for example, be positioned within the neck portion of the head chassis and arranged so that, upon the application of a force exceeding a predetermined threshold, the cam rotates or shifts, resulting in a controlled angular displacement of the bristle field. The geometry of the cam can be selected to define the range and progression of the tilt, allowing for a gradual or progressive response as the applied force increases. In some configurations, the cam may be realised as a moulded or machined component, optionally formed from a durable polymer or metal, and may be integrated with the mounting hub or support structure of the bristle field.

The compliant joint, which may be provided in conjunction with the eccentric cam, can be realised as a flexible hinge, an elastomeric insert, or a living hinge formed integrally with the neck structure. This joint may be designed to deform elastically when the cam is actuated, permitting the bristle field to tilt by a defined angle and then return to its original orientation once the excessive force subsides. In certain arrangements, the compliant joint may also serve to limit the maximum angular displacement, ensuring that the tilt remains within a safe and effective range for oral care.

Alternatively, the assembly of the eccentric cam and compliant joint may be configured so that the cam acts as a mechanical stop or guide, while the compliant joint provides the necessary flexibility for angular movement. The combination of these elements may be tailored to achieve a desired balance between resistance to tilting under normal brushing conditions and the ability to yield when excessive force is encountered. In some variants, the cam profile and the stiffness of the compliant joint may be selected to provide a non-linear or progressive response, offering increased resistance as the tilt angle increases.

It is also conceivable that the eccentric cam and compliant joint arrangement could be integrated seamlessly into the neck portion, preserving the overall aesthetics and ergonomics of the toothbrush head. The materials used for the cam and joint may include engineering plastics, elastomers, or composite materials, chosen for their resilience, durability, and compatibility with oral care applications.

The assembly of an eccentric cam and a compliant joint in the neck portion may be implemented alone or in combination with other mechanical force-protection mechanisms, such as spring-mounted subassemblies or magnetic clutches, to provide a multi-modal adaptive response to excessive brushing force. This approach may be particularly advantageous in applications where a passive, reversible, and maintenance-free means of limiting angular displacement is desired, and where user comfort and safety are priorities. The specific configuration and integration of these components may be adapted according to the intended performance characteristics, manufacturing considerations, and design objectives of the electric toothbrush head.

In some embodiments, the method of manufacturing an electric toothbrush head may additionally include the step of integrating a feedback generator into the toothbrush head, wherein the feedback generator is configured to be activated by the mechanical force-protection mechanism. The feedback generator may be realised in a variety of forms, and its inclusion is intended to provide a user-perceptible signal when the force-protection mechanism responds to excessive brushing force.

For example, the feedback generator can be implemented as a tactile device, such as a miniature vibration motor or a mechanical detent, which may produce a brief vibration or a perceptible click when the mechanical force-protection mechanism is triggered. In other possible arrangements, the feedback generator may comprise an audible element, such as a piezoelectric sounder or a mechanical component that emits a soft snap or tone upon activation. Alternatively, a visual feedback generator may be provided, for instance in the form of a light-emitting diode (LED) or another indicator light, which could illuminate or flash to alert the user that the protective mechanism has engaged.

It is conceivable that the feedback generator may be positioned within the head chassis, the neck portion, or in proximity to the bristle field, depending on the overall design and intended feedback modality. The activation of the feedback generator may be achieved passively, for example by direct mechanical coupling to the moving parts of the force-protection mechanism, or actively, via an electrical switch or sensor that detects the displacement or engagement of the mechanism.

In some variants, the feedback generator may be configured to provide a single type of signal, such as a tactile pulse, or may be arranged to deliver multiple forms of feedback, such as a combination of light and vibration. The characteristics of the feedback—such as intensity, duration, and pattern—may be tailored during manufacture to suit different user preferences or product requirements. It is also possible for the feedback generator to be user-adjustable or selectable, allowing individuals to customise the type or strength of the signal according to their needs.

Alternatively, the feedback generator may be designed to operate only when the toothbrush is in use, or may be linked to other operational features, such as a timer or brushing mode selector. In some embodiments, the feedback generator could be powered by the main power source of the toothbrush or by a dedicated energy storage element located within the head.

The integration of a feedback generator that is activated by the mechanical force-protection mechanism is not essential in all designs, but may be advantageous in applications where enhanced user awareness and reinforcement of safe brushing habits are desired. This feature may be implemented alone or in conjunction with other adaptive or protective elements, depending on the intended functionality and user experience of the electric toothbrush head.

In a further possible embodiment, the feedback generator may include an LED and either a microswitch or a Hall effect sensor, which may be positioned to detect the physical displacement of the bristle field or associated components. For example, it is conceivable that the feedback generator could comprise a light-emitting diode arranged within the toothbrush head, optionally in a location visible to the user during brushing. The LED may be configured to emit a visual signal, such as a pulse or flash of light, when activated in response to the engagement of the mechanical force-protection mechanism.

The activation of the LED may be achieved through various means. In some arrangements, a microswitch could be provided in proximity to the moving parts of the force-protection mechanism, such as a clutch, spring-mounted subassembly, or tilting joint. The microswitch may be actuated mechanically when the bristle field undergoes a displacement event—such as rotational slip, linear retraction, or angular tilt-thereby closing an electrical circuit and illuminating the LED. This approach may offer a simple and reliable means of providing immediate visual feedback to the user when excessive brushing force is detected.

Alternatively, a Hall effect sensor may be employed as part of the feedback generator. In such configurations, the Hall effect sensor could be positioned to monitor the relative movement of a magnetic element attached to the bristle field or force-protection mechanism. When the physical displacement occurs, the change in magnetic field detected by the sensor may be used to trigger the LED, providing a contactless and potentially more durable method of activation. The use of a Hall effect sensor may be particularly advantageous in designs where minimising mechanical wear or ensuring long-term reliability is a priority.

It is also possible for the feedback generator to incorporate both a microswitch and a Hall effect sensor, allowing for redundancy or for selection between activation methods depending on the specific design or user preference. The characteristics of the LED signal—such as brightness, colour, or flashing pattern—may be tailored to enhance visibility and user awareness, and may be adjustable during manufacture or by the end user.

In some variants, the feedback generator may be integrated with other user-perceptible signals, such as tactile or audible feedback, to provide a multi-modal alert when the force-protection mechanism is engaged. The power supply for the LED and associated sensors may be derived from the main power source of the toothbrush or from a dedicated battery or capacitor within the head.

Overall, the inclusion of an LED in combination with a microswitch or Hall effect sensor, optionally positioned to detect the physical displacement of the bristle field, represents one possible approach to providing clear and immediate feedback to the user. This arrangement may be implemented alone or alongside other adaptive or protective features, depending on the intended functionality and design objectives of the electric toothbrush head.

In certain embodiments, the method of manufacturing an electric toothbrush head may further include the step of forming a transparent window in the head chassis to permit viewing of at least a portion of the mechanical force-protection mechanism. The transparent window may be realised as an optional feature, for example by incorporating a section of clear polymeric material, such as polycarbonate or acrylic, into the housing of the toothbrush head. This window can be positioned in a location that allows visual access to the internal components associated with the force-protection mechanism, such as a clutch, spring-mounted subassembly, eccentric cam, or compliant joint.

It is also possible for the transparent window to be provided as a discrete insert, a moulded region, or a continuous band integrated into the head chassis. The size, shape, and placement of the window may be selected according to design preferences, manufacturing considerations, or the specific configuration of the mechanical force-protection mechanism. In some arrangements, the window may be dimensioned to allow the user or a technician to monitor the activation or movement of the mechanism during operation or maintenance.

Alternatively, the transparent window may serve an educational or reassurance function, enabling users to observe the presence and operation of the adaptive safety features. In certain variants, the window could be combined with visual indicators, such as coloured markings, moving elements, or feedback lights, to further enhance the clarity of the feedback provided to the user. The transparent material may be chosen for its durability, resistance to cleaning agents, and optical clarity, ensuring that the window remains clear and functional throughout the service life of the toothbrush head.

In some possible designs, the transparent window may be provided as a removable or replaceable component, allowing for inspection, cleaning, or replacement if necessary. It is also conceivable that the window could be incorporated as part of a decorative or branding feature, contributing to the overall aesthetics of the toothbrush head while retaining its functional role.

The inclusion of a transparent window to permit viewing of at least a portion of the mechanical force-protection mechanism is not essential in all embodiments, but may be advantageous in applications where user engagement, product differentiation, or enhanced feedback is desired. This feature may be implemented alone or in conjunction with other adaptive or protective elements, depending on the intended user experience and design objectives of the electric toothbrush head.

Example 1: Characterization of Shape-Memory Polymer Bristles for Pressure-Adaptive Response A series of bristle filaments are prepared using a polyurethane-based shape-memory polymer (SMP) with a glass transition temperature (Tg) of 32° C. The polymer is extruded into filaments with a diameter of 0.20 mm and cut to a length of 11 mm. For comparison, control bristles of identical dimensions are manufactured from conventional nylon 612. The bristles are arranged in tufts of 40 filaments each and secured to a test fixture that mimics the head geometry of the electric toothbrush. A dynamic mechanical analyzer (DMA) is employed to measure the effective stiffness of the bristles at temperatures ranging from 22° C. to 40° C. in 3° C. increments. At each temperature point, the bristle tip deflection is measured under loads from 10 g to 200 g. The SMP bristles exhibit a modulus reduction of 45% when comparing measurements at 22° C. versus 37° C., while the control bristles show only a 7% reduction. When subjected to cyclic loading at oral temperature, the SMP bristles demonstrate reversible softening behavior, returning to their original stiffness when the load is removed. The testing confirms that the SMP bristles maintain sufficient rigidity for effective plaque removal at gentle pressures (50-150 g) while automatically softening when excessive force is applied, thus demonstrating the self-regulating protective mechanism intended to prevent gum damage during aggressive brushing.

Example 2: Performance Analysis of the Magnetic Torque Micro-Clutch System

A prototype of the magnetic torque micro-clutch is constructed using two rare-earth magnets (NdFeb, grade N42) with biocompatible nickel coatings. The magnets are configured as concentric rings with a 10 mm median radius, separated by a precision-machined PTFE spacer that maintains a 0.3 mm gap. The clutch assembly is integrated into a functional toothbrush head prototype connected to a standard oscillating drive unit operating at 8,800 oscillations per minute. The assembly is mounted on a calibrated torque measurement fixture that applies progressive radial loads at the bristle tips. Load is increased in 10 g increments from 50 g to 250 g. The clutch is observed to maintain-rigid coupling up to 175 g of equivalent tip force, at which point it begins to slip, producing a characteristic tactile feedback in the form of a soft click and flutter sensation. The slip behavior demonstrates remarkable consistency, with a coefficient of variation of less than 5% across 1,000 test cycles. A Hall effect sensor mounted adjacent to the clutch successfully detects each slip event, triggering an LED pulse of 450 ms duration. The clutch maintains operational integrity through 100,000 slip cycles with no measurable drift in the slip threshold, confirming the durability of the mechanism for long-term use while providing consistent protection against excessive brushing force.

Example 3: Functional Evaluation of the Cam-Flex Self-Tilting Neck Mechanism A prototype neck mechanism is fabricated incorporating an eccentric cam machined from medical-grade acetal copolymer and a compliant joint formed from thermoplastic polyurethane (TPU, Shore A 85). The cam profile is designed with a rising slope culminating in two distinct detent positions at 6° and 12° of tilt relative to the longitudinal axis. The assembly is installed in a complete toothbrush prototype and mounted on an instrumented test rig that applies controlled torque to the head while optically tracking its angular displacement. Torque is applied in increasing increments of 0.5 Ncm from 0 to 5.0 Ncm. The neck remains stable in its neutral position until the torque reaches 1.8 Ncm, at which point it transitions to the first detent position at) 6° (+0.5° with a distinct tactile feedback. As torque increases to 3.2 Ncm, the mechanism transitions to the second detent at 12° (±0.5°). High-speed video analysis (1000 fps) shows that the reset time after torque reduction is 85 ms, well within the specified limit of 100 ms. An elastomeric lip mounted on the edge of the bristle field is observed to deploy automatically when the head reaches the 12° position, extending 0.8 mm downward to shield the gingival margin from bristle contact. The mechanism completes 250,000 actuation cycles without mechanical failure or significant deviation in performance parameters, demonstrating excellent durability for the expected product lifespan.

Example 4: Quantitative Assessment of the Shock-Absorbing Brush Head System

The shock-absorbing brush head system is constructed using a compression spring (stainless steel, wire diameter 0.3 mm, free length 4.0 mm, spring rate 1.5 N/mm) mounted between the drive connector and the bristle carrier plate. A silicone dashpot cartridge (1.0 mm internal diameter, filled with 5,000 cSt silicone fluid) is installed in parallel with the spring to provide rate-dependent damping. The assembly is mounted on a force-displacement test station that applies loads at rates varying from 1 mm/s to 200 mm/s. At low loading rates (1-10 mm/s), the head compresses smoothly, achieving full 1.5-mm retraction at 180 g of applied force. At high loading rates (100-200 mm/s, simulating jabbing motions), the damping effect becomes pronounced, limiting the initial displacement to 0.8 mm at the same force, thereby providing enhanced protection against sudden impacts. A color-coded mechanical indicator slides along a windowed scale on the neck, providing visual feedback of the pressure level (green at 0-100 g, yellow at 100-180 g, red above 180 g). A micro Hall-effect sensor detects the retraction and signals the controller to reduce motor amplitude by 30% when the retraction exceeds 1.0 mm. The system reliably returns to its extended position within 280 ms after load removal, providing effective protection against aggressive brushing while maintaining proper bristle contact during normal use.

Example 5: Integrated System Performance Under Simulated Brushing Conditions A fully assembled prototype incorporating all four protective mechanisms (pressure-adaptive bristles, magnetic torque clutch, cam-flex neck, and shock-absorbing head) is evaluated in a simulated brushing test using a robotic arm programmed to reproduce typical human brushing patterns with varying force profiles. A dentiform model with simulated plaque (fluorescent indicator) is used as the brushing surface. The testing matrix includes gentle brushing (50-100 g), moderate brushing (100-150 g), and aggressive brushing (150-250 g) scenarios. During gentle and moderate brushing, the toothbrush operates normally with full cleaning efficacy, removing 92% and 95% of the simulated plaque respectively. When aggressive force is applied, the protective mechanisms engage sequentially: first, the SMP bristles soften by approximately 40% at the oral temperature of 37° C.; second, the shock-absorbing head begins to retract at forces exceeding 150 g; third, the cam-flex neck tilts to align the bristles more parallel to the tooth surface; and finally, the magnetic clutch slips when the force exceeds 180 g, producing tactile and visual feedback. Despite these protective actions, the aggressive brushing scenario still achieves 88% plaque removal, demonstrating that cleaning efficacy is maintained even while the brush actively protects against potential gum damage. Thermal imaging confirms that the bristle tips maintain surface contact throughout the protective responses, while pressure mapping shows a significant reduction in localized pressure points when the protective mechanisms are engaged. These results validate that the integrated system effectively preserves cleaning performance while automatically limiting excessive force application across a range of brushing behaviors.

Example 6: Multi-Material Responsive Bristle Configurations

A series of advanced bristle configurations is prepared using combinations of stimulus-responsive materials to create multi-stage protection mechanisms. The first configuration incorporates a core-shell structure with a piezoelectric composite core (barium titanate nanoparticles in a flexible polymer matrix) surrounded by a magneto-rheological elastomer shell containing carbonyl iron microparticles. A miniature electromagnetic coil is embedded in the brush head beneath the bristle field. During normal brushing (50-120 g), the bristles maintain optimal stiffness. When pressure increases to the 130-150 g range, the piezoelectric core generates a small voltage proportional to the applied stress, which is detected by a microcontroller that reduces the field strength in the electromagnetic coil, causing the magneto-rheological shell to soften by up to 60%. In a second configuration, temperature-responsive hydrogel particles are distributed throughout a shape-memory polymer matrix, creating bristles that respond to both oral temperature and mechanical pressure. At body temperature, the hydrogel particles expand slightly, creating a pre-softened state in the bristle. When excessive pressure is applied, the shape-memory polymer component undergoes a secondary transition, further reducing bristle stiffness by an additional 35%. A third configuration features bristles with telescopic spiral roots that extend under pressure, effectively increasing bristle length by 0.3-0.5 mm when force exceeds 160 g, thereby distributing pressure over a larger area. These multi-material, multi-mechanism bristles demonstrate how combinations of stimulus-responsive materials can create sophisticated pressure adaptation that maintains cleaning efficacy while providing enhanced gum protection.

Example 7: Adaptive Clutch Systems with Variable Engagement Thresholds

An advanced magnetic torque clutch system is developed featuring programmable engagement thresholds that adapt to different users and brushing zones. The system incorporates a primary magnetic clutch similar to Example 2, but adds a secondary electromagnetic component that can modulate the magnetic coupling strength. When the toothbrush is used on anterior teeth (detected by an orientation sensor), the electromagnetic component strengthens the magnetic coupling, raising the slip threshold to 190 g to enable effective cleaning of these more accessible surfaces. When the brush is moved to posterior regions, the electromagnetic component reduces the coupling strength, lowering the slip threshold to 160 g to provide enhanced protection in these harder-to-reach areas where users typically apply more force. In another implementation, the clutch system features a continuous slip mode rather than a binary engaged/disengaged state. As force increases beyond 150 g, the clutch begins to partially slip, creating a soft limit that increases proportionally with applied force. This progressive slip behavior provides more nuanced feedback to the user compared to a simple on/off slip mechanism. A further variant incorporates a magnetorheological fluid-based clutch where the viscosity of the fluid changes in response to applied magnetic fields, creating a continuously variable torque transmission that can be precisely tuned to user preferences or dentist recommendations. These adaptive clutch systems demonstrate how the force-limiting mechanism can be tailored to provide personalized protection while maintaining optimal cleaning performance.

Example 8: Integrated Fluid Delivery Systems for Force-Activated Enhancement A toothbrush head is developed that incorporates a microfluidic system integrated with the force-protection mechanisms. The bristle carrier plate contains a small reservoir of a specialized oral care fluid (such as a hydrogen peroxide solution or a remineralizing agent). When the shock-absorbing mechanism compresses beyond 1.0 mm (indicating excessive pressure), a mechanical valve opens briefly, releasing a microburst of the fluid through small channels adjacent to the bristle tufts. This compensatory fluid release ensures that cleaning efficacy is maintained even as mechanical force is limited. In a more sophisticated implementation, the cam-flex tilting mechanism is coupled to a variable aperture microvalve that meters the fluid release in proportion to the tilt angle-greater tilt results in more fluid release to compensate for the reduced mechanical action. Another variant uses the magnetic clutch slip events to trigger precisely timed pulses of antimicrobial solution, effectively substituting chemical cleaning action for excessive mechanical force. The fluid delivery system can also be designed to release different formulations based on the specific protection mechanism that activates: a mild analgesic for high-pressure events, a lubricating agent during extended slip events, or an enamel-strengthening compound during rapid pressure fluctuations. These integrated fluid delivery systems demonstrate how the force-protection mechanisms can be coupled with supplementary cleaning technologies to maintain effectiveness while enhancing safety.

Example 9: Advanced Feedback and User Training Systems

A comprehensive feedback system is developed that extends beyond simple LED indicators to provide sophisticated user training. The system incorporates a small accelerometer and angular position sensor in the brush head that works in conjunction with the force-protection mechanisms. When the magnetic clutch slips, the system not only triggers an LED signal but also records the orientation and position of the brush at the moment of excess force. After the brushing session, this data is transmitted to a smartphone application that generates a 3D map of the user's mouth highlighting areas where excessive pressure was applied. Over time, the system builds a personalized pressure profile that helps users modify their brushing technique. In another implementation, the feedback system incorporates haptic training signals that vary based on which protective mechanism was activated: a single vibration pulse for initial bristle softening, a double pulse for shock-absorber compression, and a triple pulse for clutch slip events. The system also includes a mechanical "pressure odometer" visible through a window in the handle that advances with each protective event, providing a cumulative record of brushing behavior between recharge sessions. A professional version allows dentists to program specific force thresholds and feedback patterns for patients with particular needs, such as post-surgical patients or those with gingival recession. These advanced feedback systems demonstrate how the force-protection mechanisms can be leveraged not just for immediate protection but also for long-term behavior modification.

Example 10: Specialized Applications for Clinical and Sensitive Users

A series of specialized toothbrushes is developed based on the core force-protection technologies but adapted for specific user needs. For post-periodontal surgery patients, a recovery-phase brush incorporates ultra-responsive shape-memory polymer bristles that begin softening at just 80 g of pressure, combined with a low-threshold magnetic clutch (slipping at 120 g) and an extended-travel shock-absorbing system allowing 2.5 mm of retraction. For users with dental implants, a modified brush features zone-specific bristle tuning where bristles surrounding implant locations are manufactured with lower initial stiffness and enhanced temperature sensitivity. A pediatric version incorporates a quick-release magnetic coupling that temporarily disconnects the brush head if a child applies excessive force (above 140 g), then automatically reconnects when pressure normalizes, providing immediate tactile education. For elderly users with reduced hand sensitivity, the cam-flex tilting mechanism is enhanced to produce a more pronounced tactile feedback when engaged, making the pressure warning more noticeable. A professional dental hygiene model features an adjustable magnetic clutch that can be calibrated to different thresholds using a simple dial, allowing hygienists to customize the protection level for each patient's specific oral health status. These specialized applications demonstrate how the core force-protection technologies can be adapted and fine-tuned for diverse user populations with varying protection needs.

Further Embodiments

Embodiment 1. An electric toothbrush head, comprising: a bristle field having a plurality of bristles, wherein the bristles comprise a stimulus-responsive material configured to provide a reversible decrease in stiffness in response to a first condition indicative of excessive brushing pressure; and a mechanical force-protection mechanism configured to induce a reversible physical displacement of the bristle field in response to a second condition indicative of excessive brushing force, wherein said displacement comprises at least one of a rotational slip, a linear retraction, or an angular tilt.

Embodiment 2. The electric toothbrush head of embodiment 1, wherein the first condition is an increase in temperature of the bristles to an oral temperature.

Embodiment 3. The electric toothbrush head of embodiment 1, wherein the first condition is an application of mechanical force to the bristles exceeding a first pressure threshold.

Embodiment 4. The electric toothbrush head of any one of embodiments 1 to 3, wherein the stimulus-responsive material is a shape-memory polymer.

Embodiment 5. The electric toothbrush head of any one of embodiments 1 to 3, wherein the stimulus-responsive material is a piezoelectric composite.

Embodiment 6. The electric toothbrush head of any one of embodiments 1 to 3, wherein the stimulus-responsive material is a magneto-rheological elastomer, and wherein the head further comprises a magnetic field generator configured to alter a magnetic field applied to the bristles to cause the reversible decrease in stiffness.

Embodiment 7. The electric toothbrush head of any one of embodiments 1 to 6, wherein the reversible decrease in stiffness is a reduction in effective tip stiffness of at least 40 percent when measured between 22° C. and 37° C.

Embodiment 8. The electric toothbrush head of any one of the preceding embodiments, wherein the mechanical force-protection mechanism is configured to activate when the second condition corresponds to an applied tip force exceeding 150 grams.

Embodiment 9. The electric toothbrush head of any one of the preceding embodiments, wherein the physical displacement is the rotational slip, and the mechanical force-protection mechanism comprises a clutch mechanism.

Embodiment 10. The electric toothbrush head of embodiment 9, wherein the clutch mechanism is a magnetic torque micro-clutch calibrated to slip at an equivalent tip force between 160 grams and 200 grams.

Embodiment 11. The electric toothbrush head of any one of embodiments 1 to 8, wherein the physical displacement is the linear retraction, and the mechanical force-protection mechanism comprises a spring-mounted subassembly.

Embodiment 12. The electric toothbrush head of embodiment 11, wherein the linear retraction is over a distance between 1.0 mm and 2.0 mm.

Embodiment 13. The electric toothbrush head of embodiment 11 or 12, wherein the spring-mounted subassembly further comprises a viscoelastic dashpot cartridge configured to provide rate-dependent damping.

Embodiment 14. The electric toothbrush head of any one of embodiments 1 to 8, wherein the physical displacement is the angular tilt, and the mechanical force-protection mechanism is located in a neck portion of the toothbrush head.

Embodiment 15. The electric toothbrush head of embodiment 14, wherein the angular tilt is between 10 degrees and 15 degrees relative to a longitudinal axis of the neck portion.

Embodiment 16. The electric toothbrush head of embodiment 14 or 15, wherein the mechanical force-protection mechanism comprises an eccentric cam and a compliant joint.

Embodiment 17. The electric toothbrush head of embodiment 16, wherein the eccentric cam mechanism comprises at least one detent configured to provide tactile feedback upon engagement.

Embodiment 18. The electric toothbrush head of any one of the preceding embodiments, further comprising a feedback generator configured to provide a user-perceptible signal upon the inducement of the physical displacement.

Embodiment 19. The electric toothbrush head of embodiment 18, wherein the user-perceptible signal is at least one of a visual signal from an LED, a tactile signal comprising a click or patterned vibration, or an audible signal.

Embodiment 20. The electric toothbrush head of any one of the preceding embodiments, wherein the plurality of bristles further comprise hydrogel cap tips configured to swell under compressive load.

Embodiment 21. The electric toothbrush head of any one of the preceding embodiments, wherein the plurality of bristles are mounted on telescopic spiral root anchors configured to reversibly extend under compressive load.

Embodiment 22. The electric toothbrush head of any one of the preceding embodiments, further comprising a transparent window configured to permit viewing of at least a portion of the mechanical force-protection mechanism.

Embodiment 23. An electric toothbrush, comprising:
a handle comprising a drive unit; and
the electric toothbrush head of any one of embodiments 1 to 22 operably coupled to the drive unit.

Embodiment 24. The electric toothbrush of embodiment 23, wherein the drive unit is configured to momentarily reduce its operational intensity in response to the physical displacement of the toothbrush head.

Embodiment 25. The electric toothbrush of embodiment 23 or 24, wherein the handle comprises a power source operably coupled to a feedback generator located on the toothbrush head.

Embodiment 26. A method of automatically regulating brushing force applied by an electric toothbrush, the method comprising the steps of:
detecting a first condition indicative of excessive brushing pressure at a bristle field;
in response to the first condition, automatically causing a reversible decrease in the stiffness of a plurality of bristles within the bristle field, wherein the bristles comprise a stimulus-responsive material;
detecting a second condition indicative of excessive brushing force applied to the bristle field; and
in response to the second condition, automatically inducing a reversible physical displacement of the bristle field, wherein the displacement comprises at least one of a rotational slip, a linear retraction, or an angular tilt.

Embodiment 27. The method of embodiment 26, wherein the first condition comprises an increase in the temperature of the bristles to an oral temperature.

Embodiment 28. The method of embodiment 26, wherein the first condition comprises the application of mechanical force to the bristles exceeding a first pressure threshold.

Embodiment 29. The method of any one of embodiments 26 to 28, wherein the second condition comprises the application of a tip force exceeding 150 grams.

Embodiment 30. The method of any one of embodiments 26 to 29, wherein the step of inducing the reversible physical displacement comprises causing a magnetic clutch to slip rotationally.

Embodiment 31. The method of any one of embodiments 26 to 29, wherein the step of inducing the reversible physical displacement comprises causing the bristle field to retract linearly by a distance between 1.0 mm and 2.0 mm.

Embodiment 32. The method of any one of embodiments 26 to 29, wherein the step of inducing the reversible physical displacement comprises causing the bristle field to tilt at an angle between 10 degrees and 15 degrees.

Embodiment 33. The method of any one of embodiments 26 to 32, further comprising the step of generating a user-perceptible feedback signal in response to the second condition.

Embodiment 34. The method of embodiment 33, wherein generating the user-perceptible feedback signal comprises emitting a pulse of light from an LED.

Embodiment 35. The method of any one of embodiments 26 to 34, further comprising, in response to the second condition, releasing a burst of fluid or air from the electric toothbrush head.

Embodiment 36. A method of manufacturing an electric toothbrush head, the method comprising:
forming a plurality of bristles from a stimulus-responsive material, the material being selected to provide a reversible decrease in stiffness in response to a first condition indicative of excessive brushing pressure;
mounting the plurality of bristles to form a bristle field on a head chassis; and
integrating the head chassis with a mechanical force-protection mechanism configured to induce a reversible physical displacement of the bristle field in response to a second condition indicative of excessive brushing force, wherein said displacement comprises at least one of a rotational slip, a linear retraction, or an angular tilt.

Embodiment 37. The method of embodiment 36, wherein the step of forming the plurality of bristles comprises forming the bristles from a shape-memory polymer.

Embodiment 38. The method of embodiment 36, wherein the step of forming the plurality of bristles comprises embedding ferromagnetic particles into an elastomeric polymer, and further comprising integrating a magnetic field generator into the head chassis proximate to the bristle field.

Embodiment 39. The method of any one of embodiments 36 to 38, wherein the step of integrating the mechanical force-protection mechanism comprises assembling a magnetic torque micro-clutch configured for rotational slip.

Embodiment 40. The method of embodiment 39, further comprising calibrating the magnetic torque micro-clutch to slip at an equivalent tip force between 160 grams and 200 grams.

Embodiment 41. The method of any one of embodiments 36 to 38, wherein the step of integrating the mechanical force-protection mechanism comprises assembling a spring-mounted subassembly configured for linear retraction.

Embodiment 42. The method of any one of embodiments 36 to 38, wherein the step of integrating the mechanical force-protection mechanism comprises assembling an eccentric cam and a compliant joint in a neck portion of the toothbrush head configured for angular tilt.

Embodiment 43. The method of any one of embodiments 36 to 42, further comprising integrating a feedback generator into the toothbrush head, wherein the feedback generator is configured to be activated by the mechanical force-protection mechanism.

Embodiment 44. The method of embodiment 43, wherein the feedback generator comprises an LED and a microswitch or Hall effect sensor positioned to detect the physical displacement.

Embodiment 45. The method of any one of embodiments 36 to 44, further comprising forming a transparent window in the head chassis to permit viewing of at least a portion of the mechanical force-protection mechanism.

Embodiment 46: An electric toothbrush head, comprising:
a bristle field having a plurality of bristles, wherein the bristles comprise a stimulus-responsive material configured to provide a reversible decrease in stiffness in response to a condition indicative of excessive brushing pressure.

Embodiment 47: The electric toothbrush head of embodiment 46, wherein the condition is one or more of:
an increase in temperature of the bristles to an oral temperature;
an application of mechanical force to the bristles exceeding a first pressure threshold.

Embodiment 48: The electric toothbrush head of embodiment 46 or 47, wherein the stimulus-responsive material comprises one or more of:
a shape-memory polymer;
a piezoelectric composite;
a magneto-rheological elastomer.

Embodiment 49: An electric toothbrush head, comprising:
a bristle field having a plurality of bristles; and
a mechanical force-protection mechanism configured to induce a reversible physical displacement of the bristle field in response to a condition indicative of excessive brushing force, wherein said displacement comprises at least one of a rotational slip, a linear retraction, or an angular tilt.

While various aspects and embodiments have been illustrated and described in detail in the foregoing description and the drawings, such illustration and description is illustrative or exemplary and not restrictive. Variations to the disclosed embodiments can be understood and effected by those skilled in the art in practicing the claimed subject-matter, from a study of the drawings, the disclosure, and the appended claims.

Although some aspects have been described in the context of a product, apparatus, device or system, these aspects also represent a description of the corresponding process, method or use, where a block or component corresponds to a method step or a feature of a method step. Analogously, aspects described in the context of a method step also represent a description of a corresponding block or component or feature of a corresponding product, apparatus, device or system.

The order of execution of the operations in the described embodiments is not essential, unless otherwise specified. That is, the operations may be performed in any order, unless otherwise specified, and embodiments may include additional or fewer operations than those mentioned.

In the claims, the word "comprising" does not exclude other elements or steps, and the indefinite article "a" or "an" does not exclude a plurality. A single entity may fulfill the functions of several entities recited in the claims. The mere fact that certain measures are recited in mutually different dependent claims does not indicate that a combination of these measures cannot be used to advantage. Any reference signs in the claims should not be construed as limiting the scope.

REFERENCE SIGNS

100 electric toothbrush
102 bristle field
104 bristles
106 neck portion
108 toothbrush head
110 drive unit
112 force-protection mechanism
114 handle
200 routine
202 block
204 block
206 block
208 block
300 routine
302 block
304 block
306 block

The invention claimed is:

1. An electric toothbrush head, comprising:
a bristle field having a plurality of bristles, wherein the bristles comprise a stimulus-responsive material configured to provide a reversible decrease in stiffness in response to a first condition indicative of excessive brushing pressure; and
a mechanical force-protection mechanism configured to induce a reversible physical displacement of the bristle field in response to a second condition indicative of excessive brushing force, wherein said displacement comprises at least one of a rotational slip, a linear retraction, or an angular tilt.

2. The electric toothbrush head of claim 1, wherein the first condition is an increase in temperature of the bristles to an oral temperature.

3. The electric toothbrush head of claim 1, wherein the first condition is an application of mechanical force to the bristles exceeding a first pressure threshold.

4. The electric toothbrush head of claim 1, wherein the stimulus-responsive material is a shape-memory polymer.

5. The electric toothbrush head of claim 1, wherein the stimulus-responsive material is a piezoelectric composite.

6. The electric toothbrush head of claim 1, wherein the stimulus-responsive material is a magneto-rheological elastomer, and wherein the head further comprises a magnetic field generator configured to alter a magnetic field applied to the bristles to cause the reversible decrease in stiffness.

7. The electric toothbrush head of claim 1, wherein the reversible decrease in stiffness is a reduction in effective tip stiffness of at least 40 percent when measured between 22° C. and 37° C.

8. The electric toothbrush head of claim 1, wherein the mechanical force-protection mechanism is configured to activate when the second condition corresponds to an applied tip force exceeding 150 grams.

9. The electric toothbrush head of claim 1, wherein the physical displacement is the rotational slip, and the mechanical force-protection mechanism comprises a clutch mechanism;

wherein the clutch mechanism is a magnetic torque micro-clutch calibrated to slip at an equivalent tip force between 160 grams and 200 grams.

10. The electric toothbrush head of claim 1, wherein physical displacement is the linear retraction, and the mechanical force-protection mechanism comprises a spring-mounted subassembly;

wherein the linear retraction is over a distance between 1.0 mm and 2.0 mm;

wherein the spring-mounted subassembly further comprises a viscoelastic dashpot cartridge configured to provide rate-dependent damping.

11. The electric toothbrush head of claim 1, wherein the physical displacement is the angular tilt;

wherein the mechanical force-protection mechanism is located in a neck portion of the toothbrush head;

wherein the angular tilt is between 10 degrees and 15 degrees relative to a longitudinal axis of the neck portion.

12. The electric toothbrush head of claim 11, wherein the mechanical force-protection mechanism comprises an eccentric cam and a compliant joint;

wherein the eccentric cam mechanism comprises at least one detent configured to provide tactile feedback upon engagement.

13. The electric toothbrush head of claim 1, further comprising a feedback generator configured to provide a user-perceptible signal upon the inducement of the physical displacement;

wherein the user-perceptible signal is at least one of a visual signal from an LED, a tactile signal comprising a click or patterned vibration, or an audible signal.

14. The electric toothbrush head of claim 1, wherein the plurality of bristles further comprise hydrogel cap tips configured to swell under compressive load.

15. The electric toothbrush head of claim 1, wherein the plurality of bristles are mounted on telescopic spiral root anchors configured to reversibly extend under compressive load.

16. The electric toothbrush head of claim 1, further comprising a transparent window configured to permit viewing of at least a portion of the mechanical force-protection mechanism.

*  *  *  *  *